US009677972B2

(12) United States Patent
Symens et al.

(10) Patent No.: US 9,677,972 B2
(45) Date of Patent: Jun. 13, 2017

(54) SYSTEM AND METHOD FOR CHARACTERIZING TIRE UNIFORMITY MACHINES

(71) Applicant: COMMERCIAL TIME SHARING INC., Akron, OH (US)

(72) Inventors: Ronald E. Symens, Sioux Falls, SD (US); Byron R. Stanoszek, Hinckley, OH (US)

(73) Assignee: COMMERCIAL TIME SHARING INC., Akron, OH (US)

( * ) Notice: Subject to any disclaimer, the term of this patent is extended or adjusted under 35 U.S.C. 154(b) by 115 days.

(21) Appl. No.: 14/922,271

(22) Filed: Oct. 26, 2015

(65) Prior Publication Data

US 2017/0115187 A1 Apr. 27, 2017

(51) Int. Cl.
*G01M 17/02* (2006.01)

(52) U.S. Cl.
CPC ........ *G01M 17/021* (2013.01); *G01M 17/022* (2013.01)

(58) Field of Classification Search
None
See application file for complete search history.

(56) References Cited

U.S. PATENT DOCUMENTS

| RE28,775 E * | 4/1976 | Tarpinian ................ G01M 1/22 |
| | | 73/146 |
| 4,305,072 A | 12/1981 | Makita ..................... 340/870.31 |
| 4,366,707 A | 1/1983 | Jarschel .......................... 73/146 |
| 4,404,848 A | 9/1983 | Iwama et al. ................... 73/146 |
| 4,704,900 A | 11/1987 | Beebe .............................. 73/146 |
| 4,742,332 A | 5/1988 | Schroeder et al. ........ 340/347 P |
| 4,805,125 A * | 2/1989 | Beebe ................. G01M 17/022 |
| | | 324/76.44 |
| 4,852,398 A | 8/1989 | Cargould et al. ............... 73/146 |
| 4,955,229 A | 9/1990 | Himmler ........................ 73/146 |
| 5,027,649 A | 7/1991 | Himmler ........................ 73/146 |
| 5,309,377 A | 5/1994 | Beebe ..................... 364/571.04 |

(Continued)

FOREIGN PATENT DOCUMENTS

EP 2 626 684 A2 8/2013 ............ G01M 17/02

OTHER PUBLICATIONS

*Precision Gear Tooth Encoders*; CONTREX; Copyright 2010; pp. 1-12; http://idcintegration.net/wp-content/uploads/2012/11/contrex-ds53-3a-Web.pdf.

*Primary Examiner* — Andre Allen
(74) *Attorney, Agent, or Firm* — Renner Kenner Greive Bobak Taylor & Weber

(57) ABSTRACT

A method for characterizing spindle forces of a tire uniformity machine includes receiving a tire in an apparatus having an upper spindle and rim and a lower spindle and rim, wherein the rims capture the tire therebetween. A measurement data waveform is collected and an angular offset between the rims to define an engagement position is determined. The measurement data waveform is designated as a tire result waveform, and the measurement data waveform is appended to a collection of measurement data waveforms for each engagement position. Once the predetermined number of waveforms for the engagement position has been obtained, an average waveform for each engagement position is computed. A characterization waveform for each average waveform is then generated.

18 Claims, 18 Drawing Sheets

(56) References Cited

U.S. PATENT DOCUMENTS

| | | | |
|---|---|---|---|
| 5,639,962 A * | 6/1997 | Maloney | G01M 17/022 73/146 |
| 6,016,695 A | 1/2000 | Reynolds et al. | 73/146 |
| 6,089,084 A | 7/2000 | Nishihara et al. | 73/146 |
| 6,139,401 A | 10/2000 | Dunn et al. | 451/10 |
| 6,229,302 B1 | 5/2001 | Varady et al. | 324/207.25 |
| 6,244,105 B1 | 6/2001 | Nishihara et al. | 73/146 |
| 6,405,591 B1 | 6/2002 | Colarelli, III et al. | 73/462 |
| 6,481,282 B2 | 11/2002 | Douglas et al. | 73/461 |
| 6,915,684 B2 | 7/2005 | Beebe et al. | 73/146 |
| 6,988,397 B1 | 1/2006 | Delmoro et al. | 73/146 |
| 7,140,242 B1 | 11/2006 | Poling, Sr. et al. | 73/146 |
| 7,213,451 B2 | 5/2007 | Zhu et al. | 73/146 |
| 7,434,454 B2 | 10/2008 | Matsumoto | 73/146 |
| 8,701,479 B2 | 4/2014 | Symens et al. | 73/146 |
| 8,943,881 B2 | 2/2015 | Stanoszek et al. | 73/146 |
| 9,140,628 B2 | 9/2015 | Symens et al. | G01M 17/02 |
| 2002/0177964 A1 | 11/2002 | Shteinhauz | 702/75 |
| 2003/0061719 A1 | 4/2003 | Gerdes | 33/203.13 |
| 2003/0159553 A1 | 8/2003 | Poling, Sr. et al. | 82/117 |
| 2003/0196483 A1 | 10/2003 | Beebe et al. | 73/146 |
| 2003/0205080 A1 | 11/2003 | Shteinhauz et al. | 73/146 |
| 2005/0081614 A1 | 4/2005 | Zhu | 73/146 |
| 2011/0221086 A1 | 9/2011 | Hair et al. | 264/40.1 |
| 2013/0080077 A1 | 3/2013 | Meyer et al. | 702/41 |
| 2013/0205883 A1 * | 8/2013 | Symens | G01M 17/022 73/146 |
| 2013/0253686 A1 | 9/2013 | Flament et al. | 700/117 |
| 2013/0298656 A1 * | 11/2013 | Symens | G01M 17/02 73/146 |
| 2013/0298657 A1 * | 11/2013 | Stanoszek | G01M 17/022 73/146 |
| 2016/0238487 A1 * | 8/2016 | Mawby | B29D 30/0633 |

* cited by examiner

SYSTEM AND METHOD FOR CHARACTERIZING TIRE UNIFORMITY MACHINES

TECHNICAL FIELD

The present invention relates generally to tire testing equipment. In particular, the present invention relates to characterizing components of a tire uniformity machine. Specifically, the present invention relates to using characterizations of the tire uniformity machine for evaluating tires during normal testing procedures.

BACKGROUND ART

Ideally, a tire is desirable to be a perfect circle, and interior stiffness, dimensions and weight distribution and other features thereof should be uniform around the circumference of the tire. However, the usual tire construction and manufacturing process make it difficult to mass produce such an ideal tire. That is, a certain amount of nonuniformity in the stiffness, dimensions and weight distribution and other features occur in the produced tire. As a result, an undesirable exciting force is produced in the tire while the vehicle is running. The oscillations produced by this exciting force are transmitted to the vehicle chassis and cause a variety of vehicle oscillations and noises including shaking, fluttering, and sounds of the tire vibrations being transmitted inside the vehicle.

Industry standards are available for evaluating nonuniformity of a tire. In one method, a rotating drum, which serves as a substitute for the road surface, presses against a rotatably held tire with a predetermined pressing force (several hundred kilograms), or the tire is pressed against the rotating drum with the predetermined pressing force. The tire and the rotating drum are capable of rotating around their respective rotational axes, in such a way that when either one rotates, the other is also caused to rotate.

In this condition, the tire or the rotating drum is rotatably driven so that the tire rotates at 60 revolutions per minute. As the tire rotates, the exciting force produced by nonuniformity of the tire occurs. This exciting force is measured by one or more force measuring devices (such as a load cell) mounted on a bearing which rotatably supports the tire or the rotating drum, or mounted on a member attached to this bearing. From the measured value, an index that serves to evaluate the nonuniformity of the tire is computed. This measurement is referred to as a uniformity measurement.

Tires on which measurements were performed are classified into those for which the nonuniformity obtained from the index is within tolerable limits and those for which it is not. To the extent possible, tires for which the nonuniformity is outside of the tolerable limits are subjected to processing to decrease the nonuniformity. Tires that have been processed are then subjected to uniformity measurement again; those for which the nonuniformity is within tolerable limits are separated from those for which it is not.

Through the procedure described above, only tires judged to have "nonuniformity within tolerable limits" are selected and shipped to customers (or sent to the next step in the tire evaluation procedure).

Although current tire uniformity machines are believed to be effective, it is believed that further improvements can be obtained. Current tire uniformity machines provide test results that are sometimes inconsistent. In determining whether a uniformity machine is reliable, a same tire will be tested five times to ensure that the machine consistently detects and measures any nonuniformities in the tire. An additional sampling of tires is also then subjected to the same uniformity tests. From this collection of test results, various filters can be generated and applied to production tires to filter actual results. As skilled artisans will appreciate, filtering the test results undesirably adds time to the test procedure. Filtering also raises concerns that the filters may be set to exclude tires that are acceptable and, more problematically, tires that are not acceptable may be passed to allowance.

One improvement is to generate characterization plots of components of the tire uniformity machine that adversely affect the true uniformity of the tire under test. It has been determined that the forces applied by components of the uniformity machine each have their own unique characteristic that varies from machine to machine. For example, the rotating drum on one uniformity machine has a different characteristic than another rotating drum on a different machine. It is believed that each rotating drum that contacts the tire's surface and each upper and lower spindle and chuck assembly that engages the tire's bead has a unique force characteristic that contributes errors into the uniformity measurements detected by the machine. It is also believed that prior attempts to adequately characterize the spindle are deficient. In particular, prior methods did not adequately consider differences between the angular alignment or rotational position of the upper and lower spindle and chuck assemblies. As a result, different angular alignments of the spindle and chuck assemblies result in force contributions to a tire uniformity measurement that are not adequately filtered or that distort the filtered measurements in a way that does not accurately represent a tire uniformity measurement. Further force contributions may come from misalignment of the lower spindle's nose cone, which engages the underside of the tire, and the upper spindle's nose cone cup, which engages the top side of the tire. This misalignment causes an orbiting effect that contributes to tire rim runout. It will be appreciated that some alignments of the upper spindle to the lower spindle may add to rim runout while other alignments may actually lessen rim runout.

It is also known that prior methods to characterize the spindle involve testing a single tire oriented onto the rims at multiple equidistant and/or random angular positions. The angular positions and the load values of the tested tire are employed to generate a characterization waveform from a summation process of the measured waveforms. The characterization waveform is then used to remove the tire effect so as to leave the machine effect, which can then be filtered out during a tire production testing process. However, such a process does not consider or appreciate the different angular engagement positions of the upper and lower rim to the tire under test. And it is believed that the different engagement positions have a much greater impact than the runout of the rim and/or spindle.

Therefore, there is a need in the art to generate an accurate characterization of the spindle and chuck assemblies, which include the nose cone and nose cone cup, and there is a need in the art to consider alignment of the upper and lower chuck assemblies to one another so that the characterization can be consistently applied to tires being tested.

SUMMARY OF THE INVENTION

In light of the foregoing, it is a first aspect of the present invention to provide a system and method for characterizing tire uniformity machines.

It is another aspect of the present invention to provide a method for characterizing spindle forces of a tire uniformity machine, comprising receiving a tire in an apparatus having an upper spindle with an upper rim and a lower spindle with a lower rim, wherein the rims capture the tire therebetween, applying a load wheel to the tire and collecting a measurement data waveform, determining an angular offset of the lower rim in relation to the upper rim so as to define an engagement position among a plurality of engagement positions, designating the measurement data waveform as a tire result waveform, appending the measurement data waveform to a collection of measurement data waveforms for at least a predetermined number for the engagement position from a plurality of tires, determining whether the predetermined number for the engagement position has been obtained and if not, storing the tire result waveform as a tire test result for the engagement position, and if the predetermined number for the engagement position has been obtained computing an average waveform for the engagement position, generating a characterization waveform for each average waveform, calculating a final tire waveform by subtracting the characterization waveform from the tire result waveform, and storing the final tire waveform as the tire test result.

BRIEF DESCRIPTION OF THE DRAWINGS

This and other features and advantages of the present invention will become better understood with regard to the following description, appended claims, and accompanying drawings wherein:

BEST MODE FOR CARRYING OUT THE INVENTION

Figure 1:
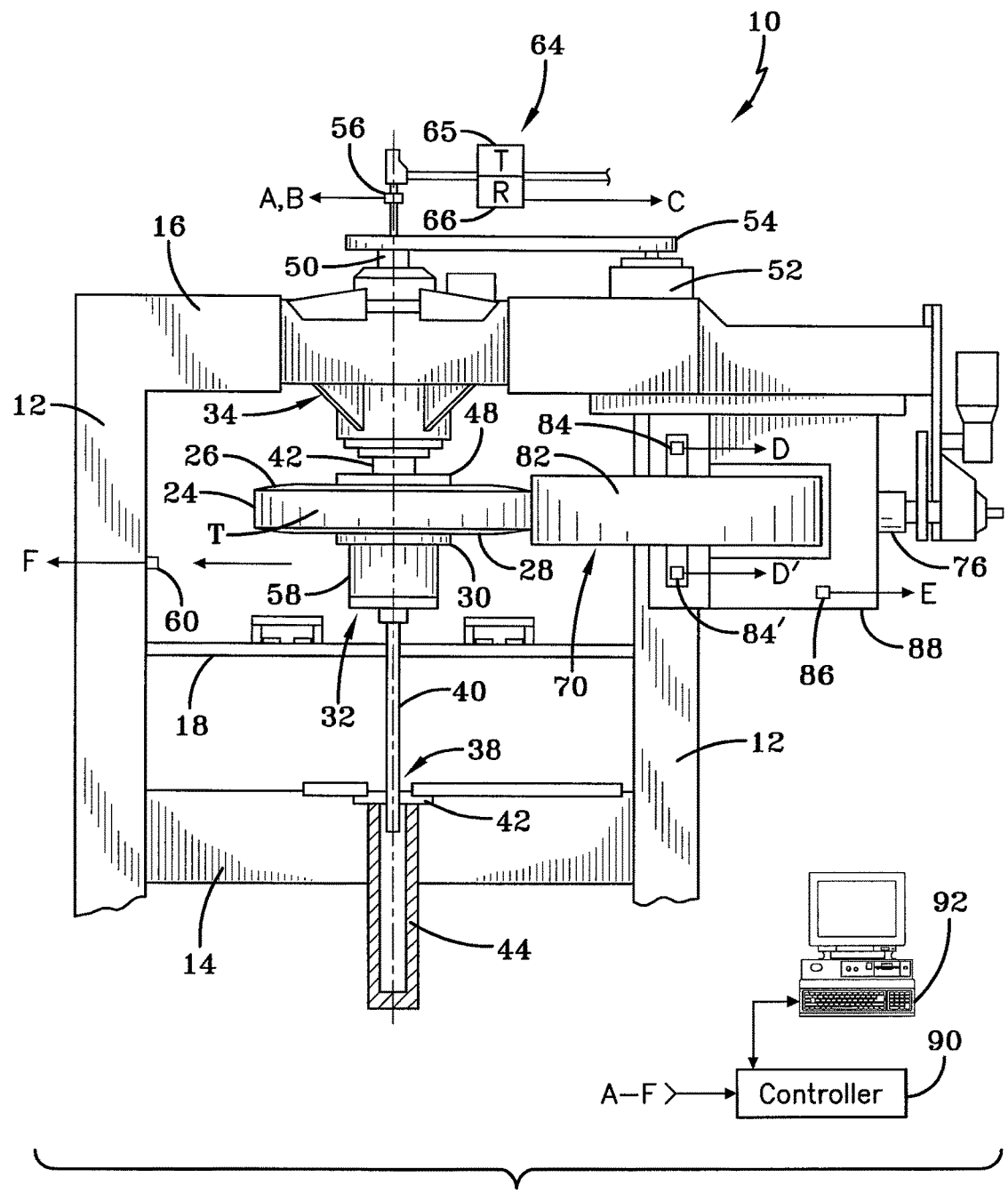
FIG. 1 is a schematic diagram of a tire uniformity machine according to the concepts of the present invention.
Figure 2:
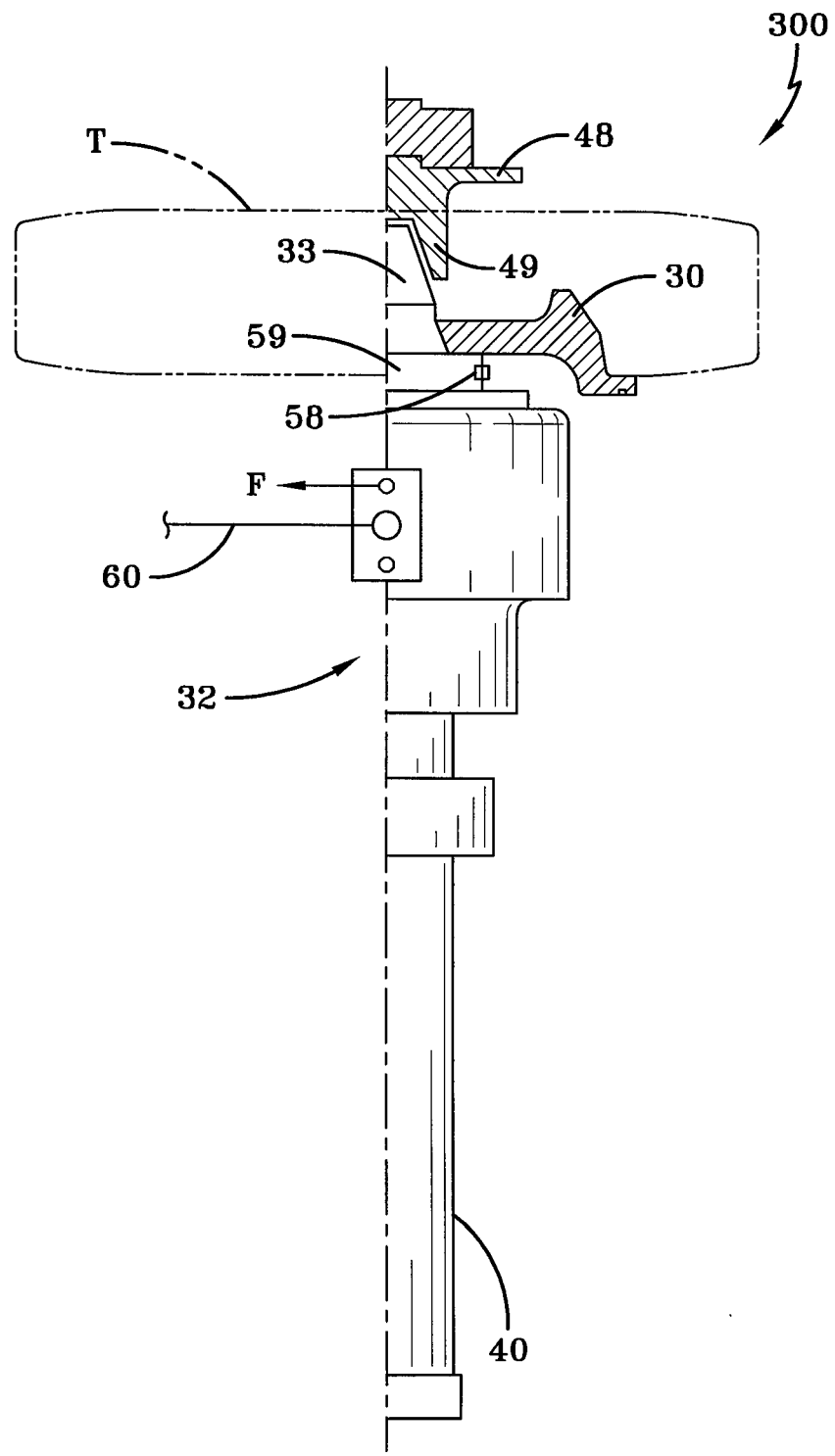
FIG. 2 is a partial front elevational view of the tire uniformity machine according to the concepts of the present invention.

Referring now to the drawings and in particular to FIGS. 1 and 2, it can be seen that a tire uniformity machine is designated generally by the numeral 10. The machine includes side frame members 12 which are connected at respective ends by a horizontal bottom frame member 14 and a horizontal top frame member 16. The side frame members 12 and frame members 14 and 16 form a box-like structure within which a tire, designated generally by the capital letter T is received, tested and discharged.

A conveyor 18 is configured with rollers which have openings therebetween upon which the tire T is delivered to the machine 10. Each tire T includes a tread 24 adjacent substantially parallel sidewalls 26 which have beads 28 forming an inner diameter of the tire.

The machine 10 includes an apparatus for receiving and rotating the tire and, in particular, a lower spindle and chuck assembly 32 and an upper spindle and chuck assembly 34. Both the lower and upper spindle and chuck assemblies are outfitted with removable rims 30 and 48, respectively, which can be in various sizes as needed to fit the bead diameter of a tire to be tested. The lower spindle and chuck assembly 32, which includes a lower spindle nose cone 33, is carried and supported by the frame members 12 and 14 and is positioned so as to engage the tire as it is supported by the conveyor 18. In particular the lower spindle and chuck assembly 32 includes a hydraulic unit 38 which provides a shaft 40 that maintains a piston 42 contained within a cylinder 44. At the appropriate time, the hydraulic unit forces the nose cone 33 and the rim 30 to engage the tire, in particular the lower bead 28, through an opening in the conveyor 18 so as to move the tire into a testing position.

The upper spindle and chuck assembly 34 receives the other side of the tire T on the rim 48 from which extends a nose cone cup 49, which mates with the nose cone 33, when the lower spindle and chuck assembly engages the facing sidewall 26 at the bead 28 of the tire on the rim 30. The spindle and chuck assembly 34 includes a rim 48 which is rotated by a spindle 50, and the assembly 34 may also include spindle bearings, a rim adapter, an upper spindle nose cone cup, and other associated components. The spindle 50 is driven by a motor 52 and an interconnecting belt drive 54 which connects the spindle 50 to the motor. Skilled artisans will appreciate that although the nose cone 33 and nose cone cup 49 are substantially axially aligned with one another, each machine's alignment will be slightly skewed or negligibly misaligned. And the lower and upper spindles, although generally axially aligned, will exhibit a certain degree of misalignment. This misalignment causes an orbiting effect as the tire is rotated which in turn creates runout in both the radial and lateral measurement planes. Moreover, any skew in either the upper or lower spindles may also contribute to generation of undesired forces being detected during a uniformity measurement. The skewing and misalignment contribute to unwanted lateral and/or radial distortions in test data as each tire is tested for uniformity. The lateral and radial distortions may be further exacerbated by different angular alignments between the upper and lower spindle assemblies.

Briefly, in operation, the tire is delivered along the conveyor 18 and stopped at the appropriate position so that the lower spindle and chuck assembly can engage the lower facing side of the tire T. The lower rim then moves the tire into engagement with the upper rim, whereupon the tire is inflated and then rotated to initiate the testing process.

A tire encoder 56 is carried by the upper spindle 50 to monitor the rotational position of the rim 48 and the tire T during rotation. The encoder 56 generates a signal A dividing the tire circumference into equal segments and a signal B indicating a fixed single position on the circumference at any given point in time. The signal B may be referred to as the 0 segment. As such, operation of the motor may be monitored by the encoder 56.

A flag 58 or other similar indicia may be mounted to a lower adapter plate 59 that is underneath the rim 30 and rotates therewith. A proximity switch 60 may be mounted on the frame member 12 proximal to the lower chuck and spindle assembly 32 to detect the flag 58 when the rim 30 is rotated to or past a particular orientation. The proximity switch 60 generates an output signal F which is received by the controller 90. Accordingly, when signal F indicates that the flag 58 is passing by and detected by the proximity switch 60, the precise angular orientation of the adapter plate 59 and, accordingly, the connected lower spindle and chuck assembly is known. In other words, since both upper and lower rims are angularly fixed to the tire during rotation, the present encoder value of the upper spindle may be recorded as the index point of the lower spindle at the time the proximity switch 60 detects the passing of the flag 58. In the alternative, the lower spindle's angular position may be calculated at any time by finding the difference of the upper spindle encoder's present value and the value of the upper spindle encoder at the time the proximity switch 60 detects the passing of the flag 58. The signal F may be generated upon rotation of the tire which determines the location of the lower rim to the upper rim by the lower rim's position relative to the segments defined by the upper spindle's tire encoder 56. In other words, the flag signal F determines which of the aforementioned segments (defined by signal B) for the tire data is coincident with the flag 58 position at the time the flag 58 passes the proximity switch 60. The angular offset between the upper and lower spindles may also be referred to as an angular engagement position.

A tire inflation system 64 includes an air pressure transducer 65 which monitors the air pressure of the tire and an air pressure regulator 66 to regulate the tire pressure to a desired pressure. As previously indicated, after the chuck assemblies engage the tire, the tire is inflated by the inflation system to a desired pressure prior to testing of the tire. The air pressure transducer 65 generates a pressure signal C.

A load wheel 70 moves horizontally into and out of contact with the tire T so as to apply a load to the tire and test for tire uniformity. The load wheel may be constructed with at least two substantially parallel spaced apart plates, but it will be appreciated that a single plate or multiple plates could be used. The outer diameter of the plates support a radial surface 82 which engages the tire tread as shown in FIG. 1. Skilled artisans will appreciate that the overall construction of the load wheel, including the materials, welds, machining and the like, affects the characteristics and operation of the load wheel 70 and, in turn the machine 10. The same construction concerns are also applicable to the other components of the machine 10 that contact and engage the tire—the upper spindle and chuck assembly 34, the upper rim 48, the lower spindle and chuck assembly 32, the lower rim 30 and the tire inflation system 64. All of these components, no matter how slight, impact the test data collected from the tire during its testing process.

It can be seen that the load wheel 70 is mounted within a carriage 88, which is maintained by the frame members, and moved into and out of position to engage the tire by a motor and gearing assembly 76 also carried by the frame members 12. At least one load cell 84 is associated with the load wheel 70 and detects the forces exerted by the tire on the wheel during rotational movement. Each respective load cell generates a load cell signal D and D'. It will be appreciated that a single load cell may be used but that additional load cells 84 may be provided to confirm the readings of the first load cell signal, or share the force of the load, or to detect slight variations in the tire construction.

A load wheel encoder 86 is carried by the carriage 88 so as to monitor the rotational or angular position of the load wheel. The encoder 86 generates an encoder signal E.

A computer 92, through a controller 90, receives the signals A-F so as to characterize the particular components of the tire uniformity machine and/or acquire other detected measurements generated during the tire testing process. As such, these signals represent the variable forces exerted by the tire under test and also to analyze the components of the tire uniformity machine which apply forces to the tire during testing. The controller 90 is also used to generate signals that operate the motors, valves, servos, and conveyors needed to move the tire T into the machine and ready it for testing. The controller 90 is connected to a computer 92 which can display and collect the data and also manipulate and analyze the data collected as represented by the signals A-F and any other data signals collected. Skilled artisans will appreciate that the controller 90 and computer 92 may work in tandem or separately to control components of the machine 10 and process and present the data collected into a format usable by manufacturing personnel. Moreover, both the computer and the controller include the necessary hardware, software and memory needed to implement and carry out the operations of the machine 10 and the characterization processes to be described.

Generally, the monitoring of the particular components of the tire uniformity machine is done to characterize the machine's mechanical behavior, whereupon the computer removes the unwanted influences caused by the machine's mechanical condition during production tire testing. Utilization of the machine characterizations determines whether a detected measurement is suitable for use as a valid test result and then, with an analysis based on the machine's mechanical characterization, unwanted waveform properties can be removed which are attributable to the machine's mechanical parts, its measurement apparatus and so on. These unwanted waveform properties can now be specifically identified by the computer and software processes. As such, the unwanted portions of the waveforms that detract from both the precision of the measurement and its conformance (repeatability) to prior measurements can be adjusted for.

In order to accurately determine the force contribution of the spindle assemblies when testing tires, it may be desirable to first remove force contributions from the load wheel. U.S. Pat. No. 8,701,479, which is incorporated herein by reference, sets out a process for characterizing the load wheel forces and removing those forces from the measured forces. Briefly, the process in the '479 patent utilizes a known low spring rate tire to record and measure data related to the load wheel. The same step is taken for a known high spring rate tire. The collected waveforms are then used to generate a load wheel characterization waveform which may then be removed from the waveforms of tested tires to remove load wheel characteristics and provide an accurate representation of the tire under test.

As alluded to in the Background Art, the upper and lower spindles and associated components are believed to exert both undesirable radial and lateral forces on the tire being tested. The lateral forces are primarily attributable to the reaction of the spindle assembly components to forces applied by the load wheel. The radial forces are primarily attributable to the misalignment of the rims and the nose cone to the nose cone cup when engaging the tire under test. It will thus be appreciated that any change to a component of the upper and/or lower spindle assemblies will likely change their characterization waveforms. As such, any time a different size tire is to be tested, which requires a change to the lower and upper rims that engage the tire, the disclosed characterization procedures will need to be re-run.

As used herein, the term spindle characterization refers to the characterization of the entire upper and lower spindle, spindle bearings, rim adapters (which is also referred to in this description as an upper chuck) and the rims. The basic idea of spindle characterization is that the spindle runs out just like the load wheel, and the amount of run out observed in the resulting radial force test waveform is directly correlated to the spring rate of the tire, just as in the load wheel. However, the spindle characterization is different than that of the load wheel, because the tire is mounted "to" the spindle. Thus the ratio of tire position to spindle position is always 1:1. This ratio being different is why a load wheel characterization can be obtained by spinning the tire 600 times and measuring where it lands in different locations on a load wheel. As a result, different methodologies have been developed to specifically measure the spindle characterization.

For both the radial and lateral force characterization processes described below it will be appreciated that a number of tires will need to be tested to collect sufficient data regarding the characteristics of any given machine 10. As data is collected over time, a true representation of the machine's characteristics can be obtained. Such a methodology will require re-collection of sufficient data any time a structural change or mechanical component of the machine 10 is replaced, such as a new rim adapter, upper or lower spindle chuck assemblies, a removable rim, a rim adapter, spindle bearings, spindle, nose cone, nose cone cup or rim, etc. is made to the tire uniformity machine. In other words, at least the set of collected normalized waveforms and the average waveforms described below are re-set to a null value whenever a component of the tire uniformity machine is replaced. It will also be appreciated that the characteristics of the machine change over time due to wear, servicing and other environmental changes. These changes may cause gradual changes to the radial and lateral characterizations to be described. Accordingly, once a sufficient history or population of tires has been tested and their test data collected, the oldest test tire data may be removed from the characterization processes.

For the radial force characterization disclosed herein, consider that a tire has a spring-rate, which is defined in terms of pounds of radial force seen by the load wheel for each inch the load wheel moves into the tire toward the spindle. During a test, when the load wheel position is fixed in place, an out-of-round spindle and/or rims will also push the tire toward or away from the load wheel in a repeating fashion with a frequency equal to one revolution of the tire. It can be directly assumed/concluded that the non-constant orbiting of the spindle, combined with the runout of both the upper and lower rims holding the tire, creates a radial force waveform that is added to each test waveform of the tire during testing, resulting in inaccurate tire uniformity waveforms. The following procedure describes how to characterize radial forces in a spindle characterization waveform. Once characterized, the waveform can be mathematically subtracted out of the test data, which results in increased accuracy of the test data.

Figure 3A:
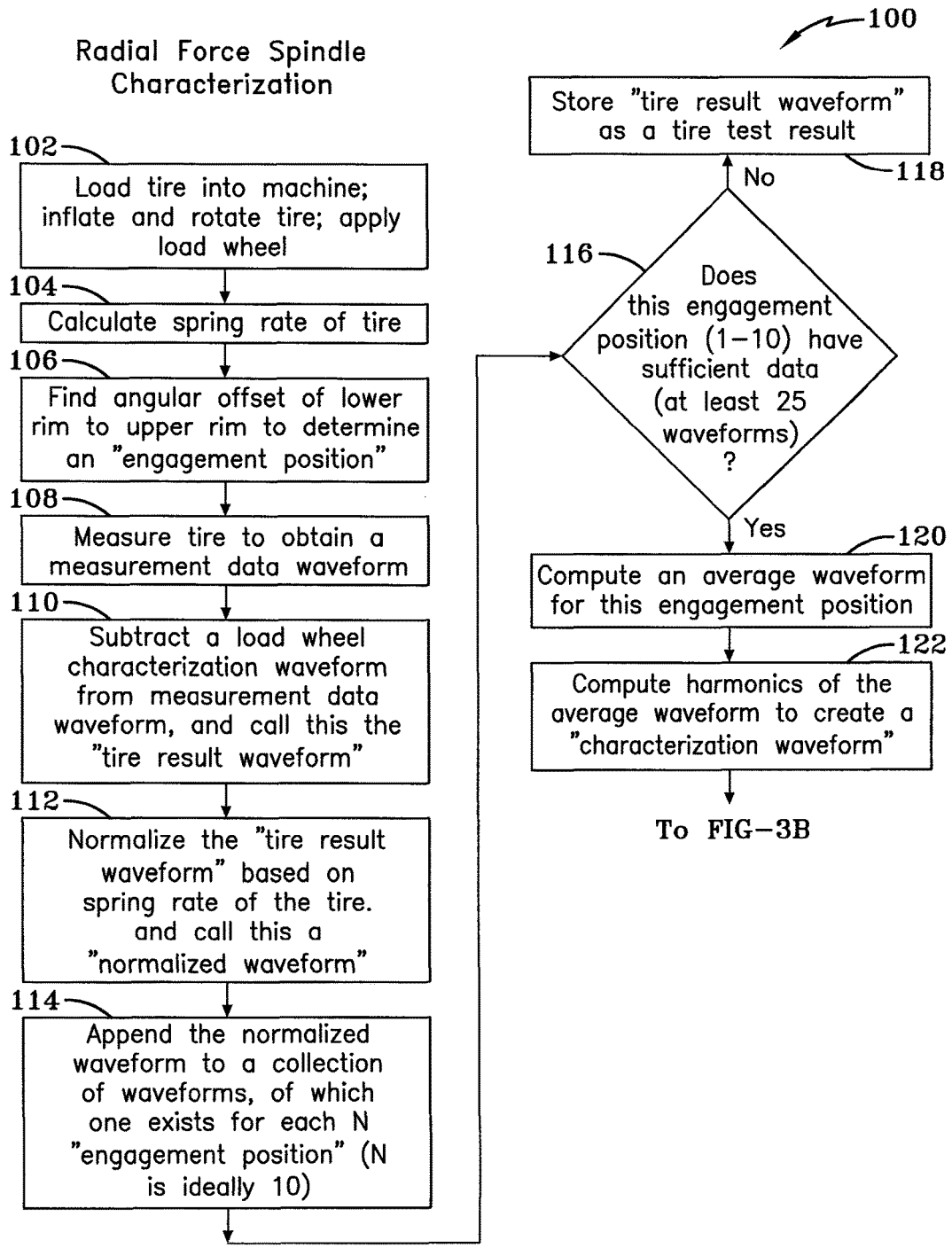
FIGS. 3A and 3B present a flow chart showing a radial force spindle characterization process according to the concepts of the present invention.
Figure 3B:
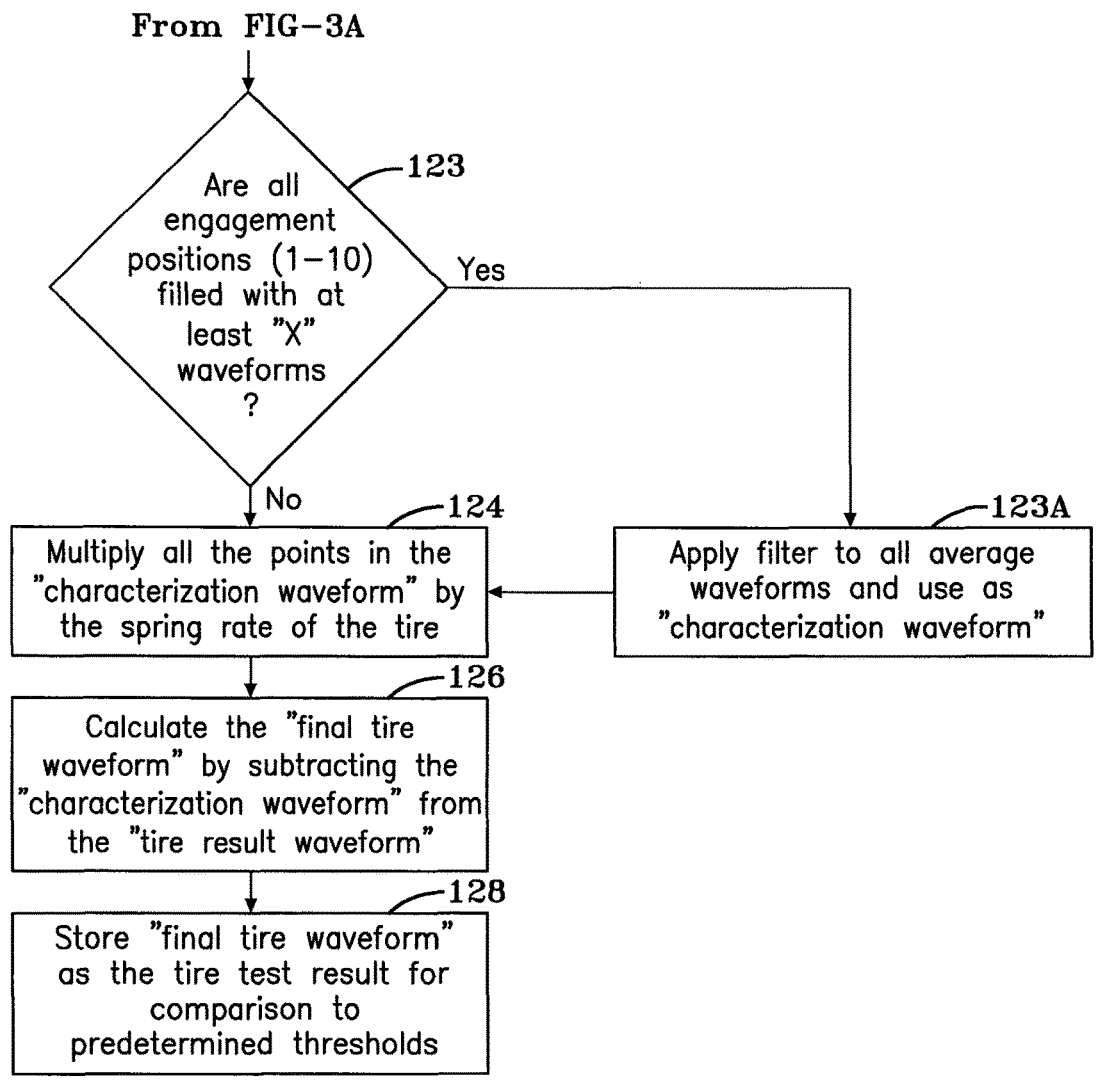

Referring now to FIGS. 3A and 3B, a methodology for determining a radial force spindle characterization is designated generally by the numeral 100. In this process, at step 102, a tire to be tested is inserted into the machine 10, inflated and then rotated by the lower and upper spindle and chuck assemblies 32 and 34. Once a desired rotational speed is obtained, the machine applies the load wheel 70 to determine a load wheel characterization. If the load wheel characterization is already known by other methods, as noted above, then the load wheel characterization step may not be required. In any event, at step 104 a spring rate of the tire under test is calculated from sensors 84 and the controller 90. Next, at step 106 an angular offset of the lower rim to the upper rim is determined and a calculation is made to determine an "engagement position" to be described. As previously noted, the upper angular position is determined by the tire encoder 56 and the lower angular position is determined by the flag 58 and the proximity switch 60. The resulting signals A, B and F are received by the controller 90 which determines an engagement position for the tire being tested.

At step 108 signals D and E, which are generated by the force sensors, are measured. This results in a series of data associated with the tire under test. This data may be referred to as a measurement data waveform that can be associated with the specific tire under test and which can be aggregated with similarly tested tires in determining the spindle characterization forces. At step 110 the previously determined load wheel characterization is subtracted from the measurement data waveform and stored. The stored waveform may be referred to as the "tire result waveform." The load wheel characterization should ideally be removed from the measurement data waveform as the load wheel introduces measurement errors that diminish the accuracy of the spindle characterization. However, if the load wheel characterization is not available, the spindle characterization may proceed, albeit with less than optimal results. Next, at step 112 the tire result waveform is normalized based upon the calculated spring rate of the tire, calculated in step 104, so as to generate a normalized waveform.

At step 114 the normalized waveforms are collected into an appropriate one of N engagement positions wherein N may be equal to ten, although at least two or any number of other engagement positions may be employed. In other words, the circumference of the spindle may be segmented into ten or more, or fewer, substantially equal portions such that each angular engagement position—the position of the lower rim with respect to the upper rim—is determined and associated with one of the portions. For example, if there are ten engagement positions, each engagement position is about a 36° portion of a 360° range of angular offset positions between the upper and lower spindles. In other words, the first engagement position collects tire measurement data for any occurrence of when the angular offset positions between the upper and lower spindles is between 0-36°, the second engagement position is for any occurrence of when the angular offset is between 36°-72°, and so on. Other angular intervals could be used. Each time a tire is tested, its data (the normalized waveform) is appended to the previously collected set of data associated with that particular engagement position.

Next, at step 116, the characterization process determines whether there is sufficient data collected for each of the designated engagement positions. In the present embodiment, it is believed that a minimum of 25 waveforms are needed to obtain a spindle characterization for each designated engagement position. However, if a load wheel characterization is not utilized in step 110, skilled artisans will appreciate that more than 25 waveforms may be needed for each engagement position. Once a predetermined number of tires are tested and their data is associated with each of the designated number of engagement positions, then a complete or reliable characterization can be obtained as will be described. However, if it is determined that the designated engagement position is not filled with sufficient data (at least 25 waveforms), the process continues on to step 118 wherein the tire result waveform, from step 110, is stored as the tire test result. In view of the insufficient amount of data collected at this point in the characterization process, a complete characterization cannot be obtained. As such only an unfiltered result can be obtained. If desired the tire can be re-tested later when the characterization process is complete.

Figure 7:
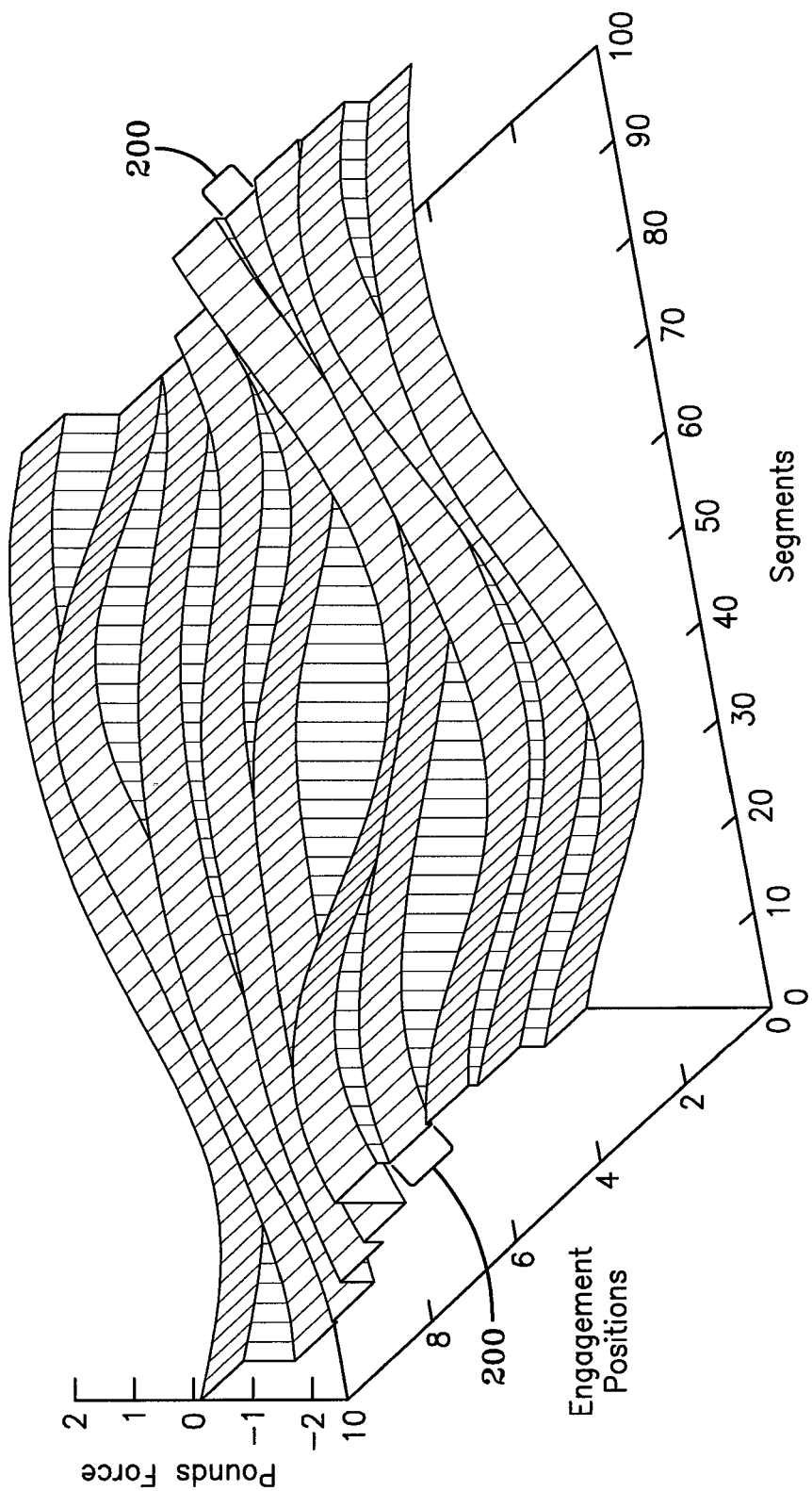
FIG. 7 is a three-dimensional graphical representation of radial characterization waveforms obtained using the process according to the concepts of the present invention.

Returning to the process 100, if the specific engagement position is filled with sufficient data at step 116, then the process continues to step 120 where the controller computes an average waveform for the designated engagement position. This average waveform contains the combined force variations of the upper and lower spindles, which are evident in the overall radial force measurements, for the designated engagement position. Skilled artisans will appreciate that over time the average waveform result will accommodate any incremental changes in operation of the spindles and their associated components. Next, at step 122, the controller computes at least a first harmonic waveform of the average waveform to generate a characterization waveform. Specifically, a radial characterization force waveform is generated. A first harmonic computation reveals the primary orbiting point and force component produced by the engagement of the spindles. Using only the first harmonic in the computation provides a correction for this non-centric orbiting point while introducing minimal noise into the tire test waveform. Additional harmonics above the first may be used to compute the characterization waveform in order to further characterize forces exaggerated by localized rim runout, such as defects (high or low areas) in the individual rims and nose cone and/or nose cone cup. Indeed, the first harmonic better defines the one-time-per-revolution (or once-per-traversal of the circumference) effect than the combined rim runout and the orbital effect of the nose cone to the nose cone cup misalignment may have on the measured result. In contrast, point-by-point accumulations of the data may include extraneous noise and provide a less useful waveform for analysis. Representation of characterization waveforms are shown in FIG. 7 and will be discussed in detail below.

Figure 8:
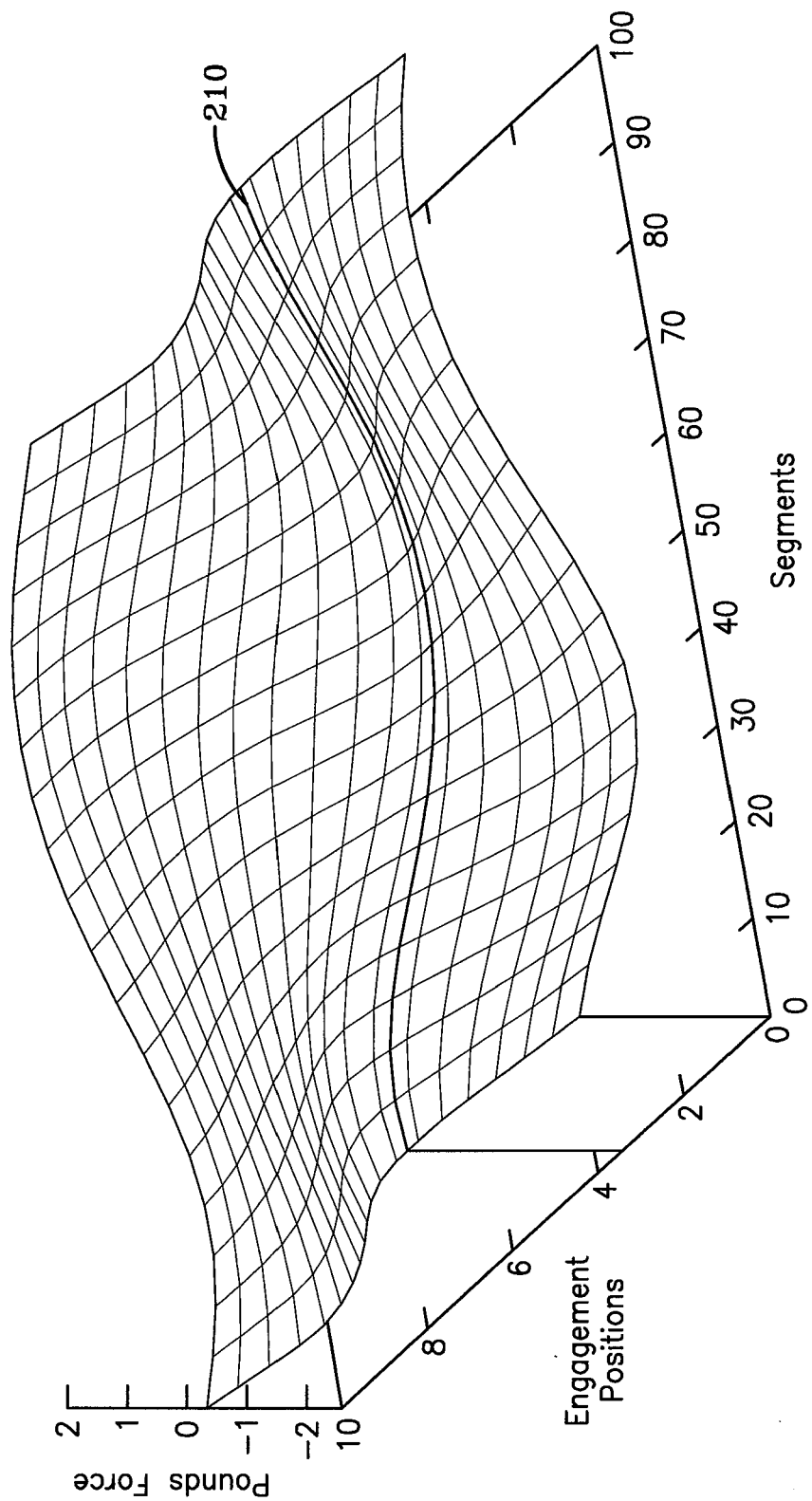
FIG. 8 is a filtered three-dimensional graphical representation of radial characterization waveforms obtained using the process according to the concepts of the present invention.

Additional filtering may be applied to the characterization waveform. At step 123, the process will determine whether all the engagement positions (1-10) are filled with a predetermined number of waveforms. In the present embodiment, it is believed that a minimum of at least 25 waveforms are needed, but some other minimal number could be used. If a full allotment of waveforms for all the engagement positions is available, then at step 123A a filter is applied to all characterization waveforms, which may then be used as the characterization waveform. A representation of the filtered characterization waveforms is shown in FIG. 8 and will be discussed in detail below.

At step 124 all points in the characterization waveform are multiplied for that engagement position by the spring rate of the tire (step 104). Next, at step 126, the final tire waveform is calculated by subtracting the characterization waveform (modified by the spring rate) from the tire result waveform obtained in step 112. Finally, at step 128, the controller stores the final tire waveform as the tire test result which is compared to predetermined thresholds to determine whether the tire under test is within the desired dimensional and/or operational parameters. Once all the engagement positions are filled with the predetermined number of waveforms, the oldest data may be removed from the averages. In the alternative, once some other relatively large number of tire tests has been obtained, for example 2,500 tests, then the next tire tested results in the oldest test tire data being removed from the calculations.

Referring now to FIGS. 4A-J, a series of polar plots are presented which show the effect the designated engagement position has on the radial force spindle characterization. Each plot represents 100 segments that are used for the measurement points in a waveform; and the circles, which range from −2 at the center to +2 at the outer circumference, represent pounds of unwanted force variation that are added to or subtracted from the measurement due solely to the engagement (runout and orbit–radial forces) of the spindles. Skilled artisans will appreciate that the term "segment" refers to any one of the 100 measurement points around the tire which corresponds to a point on the upper rim. In other words, there are 100 segments of radial force data points measured per revolution. The lower rim effectively engages the upper rim, and the flag on the lower rim determines the engagement position in this manner. If the flag is in the area corresponding to the segments 0 to 9 on the upper rim, the flag is in engagement position 1. If the flag is in the area corresponding to the segments 10 to 19, then the flag is in engagement position 2, and so on. In the plots, the solid line represents the actual unwanted force (characterization) that was determined by averaging all the waveforms together as set out at step 120. The dashed line in the plots represents a first and second harmonic applied to the unwanted force characterization. Both of these waveforms are normalized to the actual spring rate of the currently measured tire. The values represented by the dashed line are then used in the characterization waveform subtraction from each of the 100 corresponding segments in the tire result waveform. The dashed line represents the characterization waveform calculated in step 124 and further utilized in step 126.

Figure 4A:
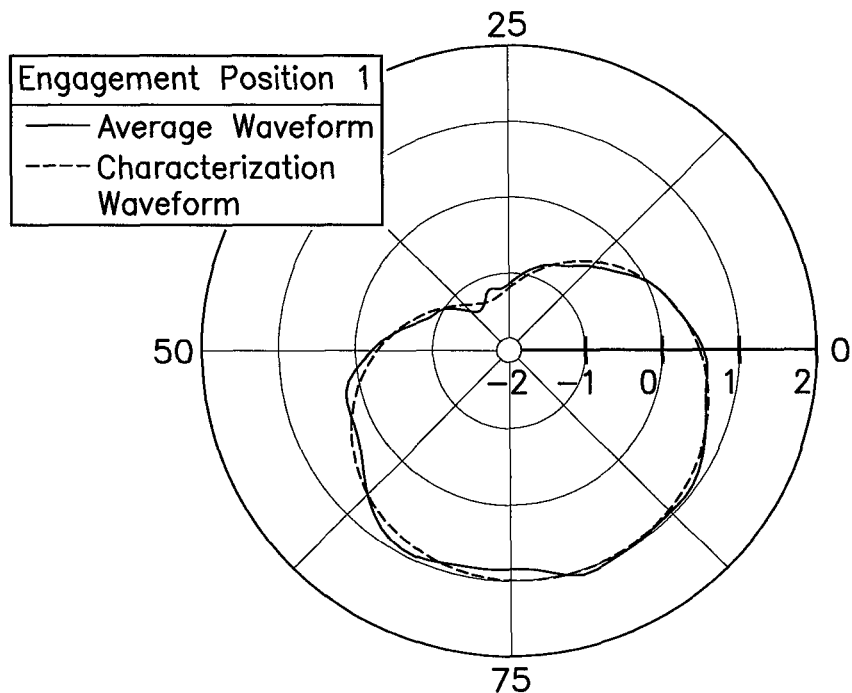
FIGS. 4A-4J are exemplary radial force spindle characterization waveforms used in the analysis of a tire being tested by the tire uniformity machine.
Figure 4B:
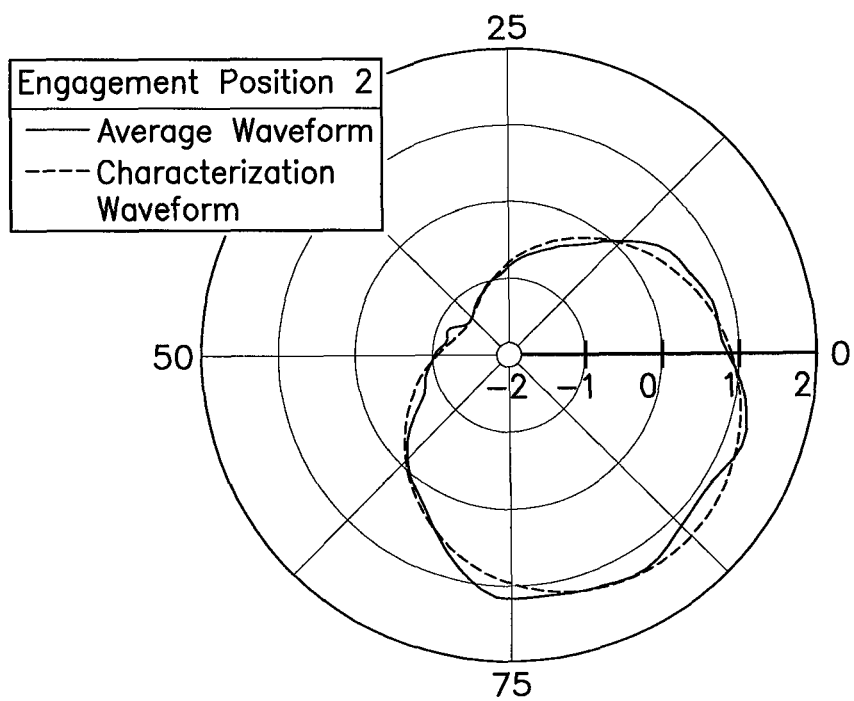
Figure 4C:
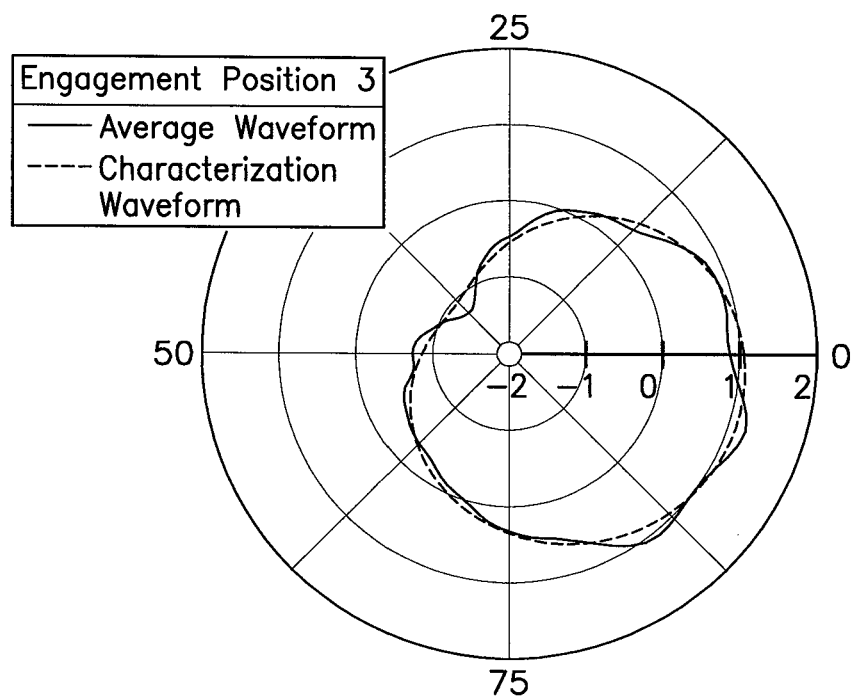
Figure 4D:
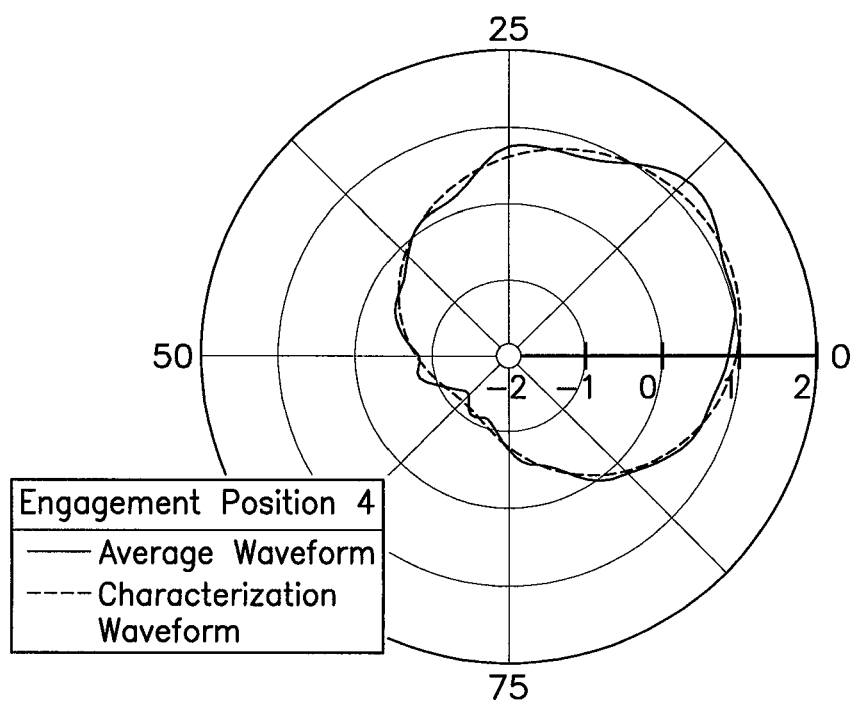
Figure 4E:
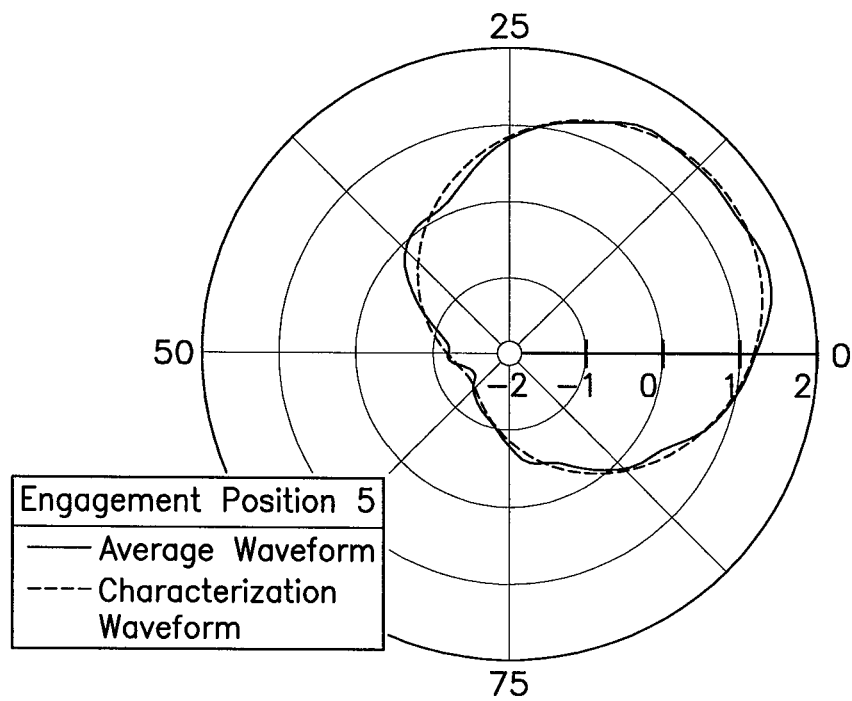
Figure 4F:
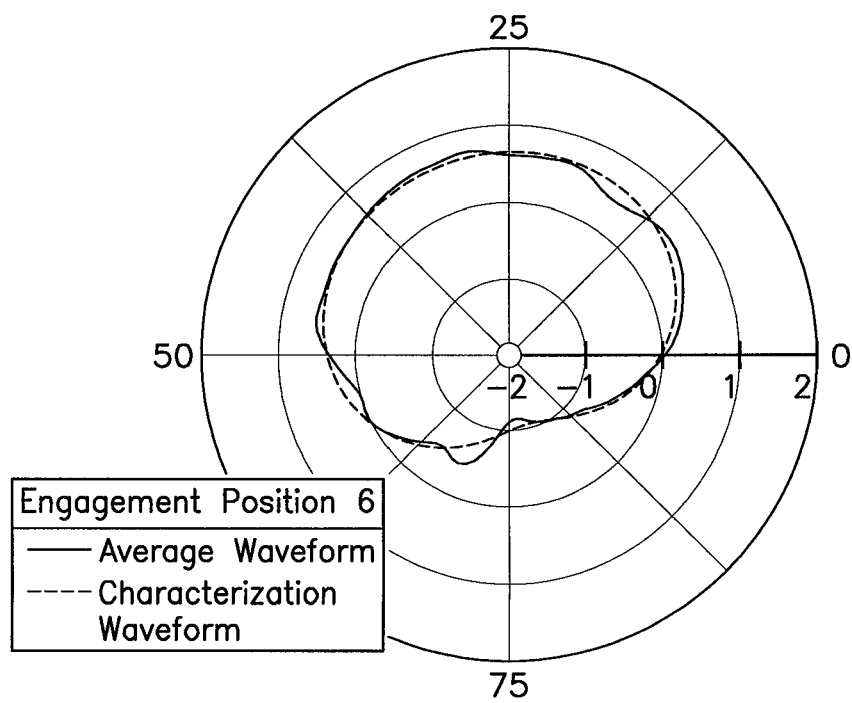
Figure 4G:
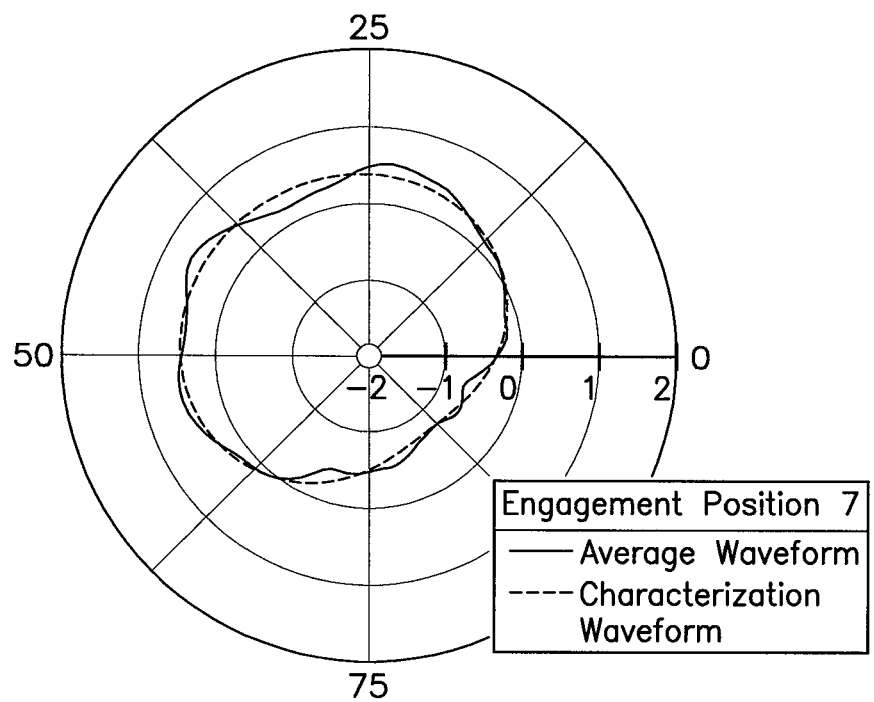
Figure 4H:
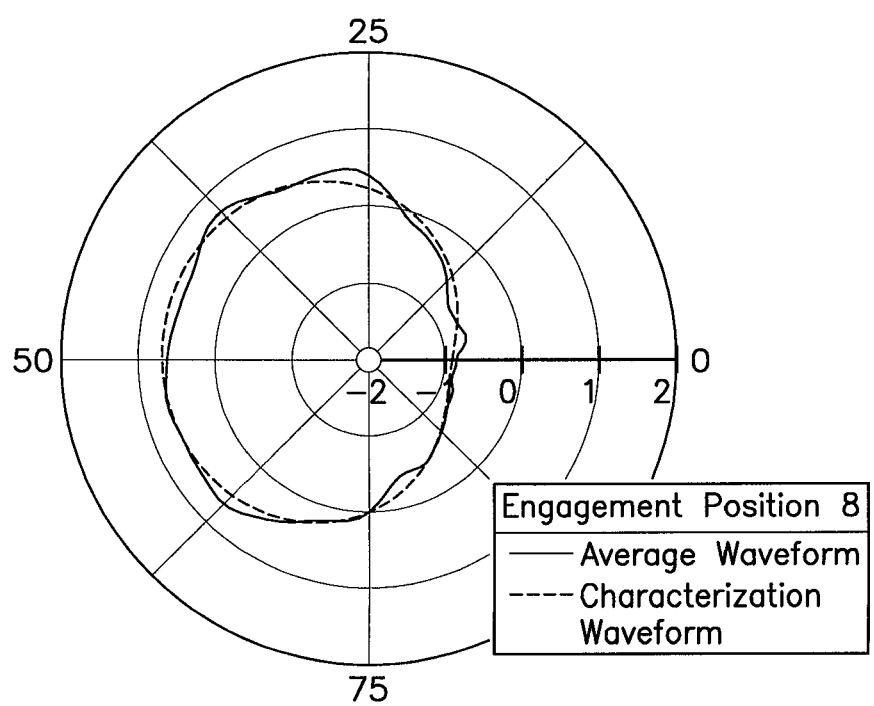
Figure 4I:
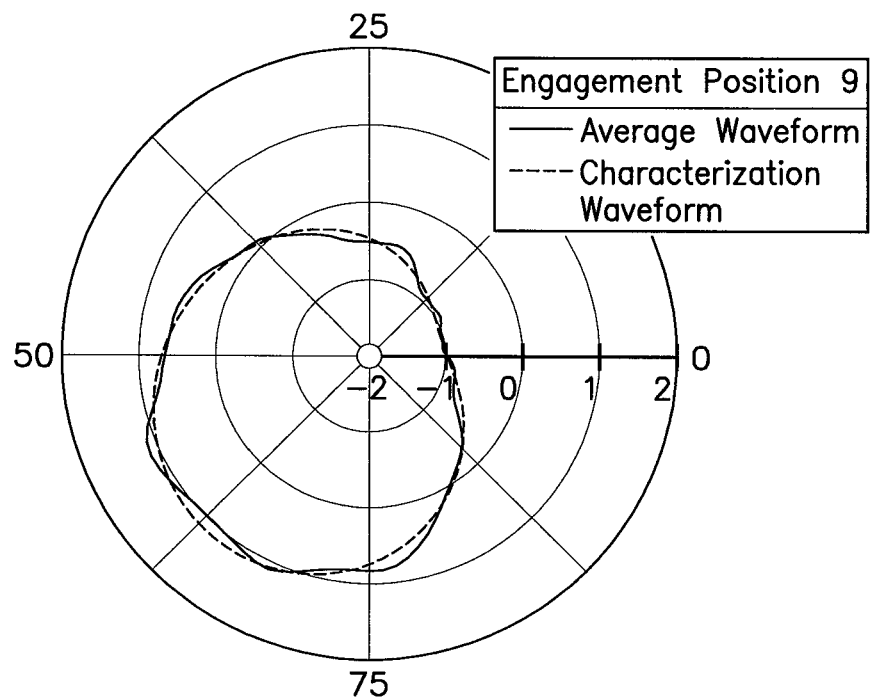
Figure 4J:
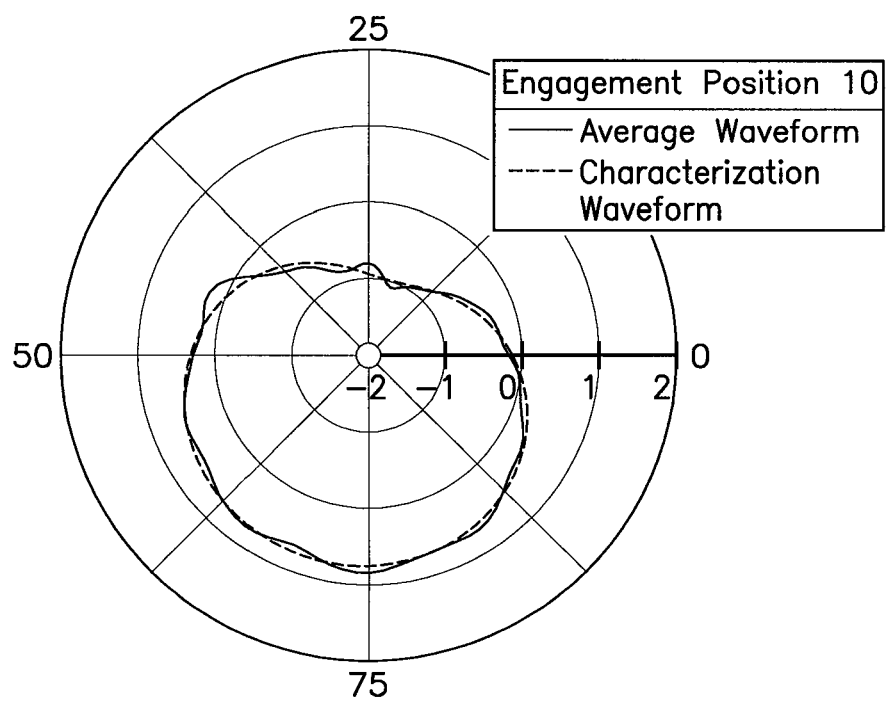

As can be seen in FIG. 4A, a characterization force low spot is present at about segment 25 in the first engagement position. And that low spot progresses in a counterclockwise manner around the segment axis (the circle) as the engagement position traverses from 1 to 10 (FIGS. 4A-J). It will further be appreciated that the characterization force high spot, which is at about segment 75, also moves in a counterclockwise direction in much the same manner as the low spot. Use of only the first and second harmonics in the characterization waveform provides a smooth characterization curve so there will be less added "noise" when subtracting the characterization waveform from the tire result waveform.

For the lateral force spindle characterization, skilled artisans will appreciate that consideration of radial forces applied during a normal tire test are not required for a lateral force determination. A methodology for determining a lateral force characterization is designated generally by the numeral 100' shown in FIGS. 5A and 5B. This methodology is similar to that shown in FIGS. 3A and 3B and described above, except that steps related to the determination and use of the tire's spring rate (steps 104, 112 and 124) are not required. Otherwise, all the other steps including removal of old test data are nearly the same and incorporated into the present methodology, but are provided with a prime designation (e.g. 102'). The notable exception is that in step 114' the tire result waveform is appended to a collection of waveforms instead of the collection of normalized waveforms. As a result, a lateral force characterization waveform is generated at step 122'. In any event, during this particular aspect of the test, which may be determined simultaneously with the radial force spindle characterization steps, the methodology detects any lateral forces related to the nose cone and/or nose cone cup and related rim connections when the tire is captured between the upper and lower spindle chuck assemblies. As with the radial force determination, it is believed that the forces applied by the lateral components of the tire uniformity machine 10 contribute to undesired fluctuations during a tire test waveform measurement.

Figure 5A:
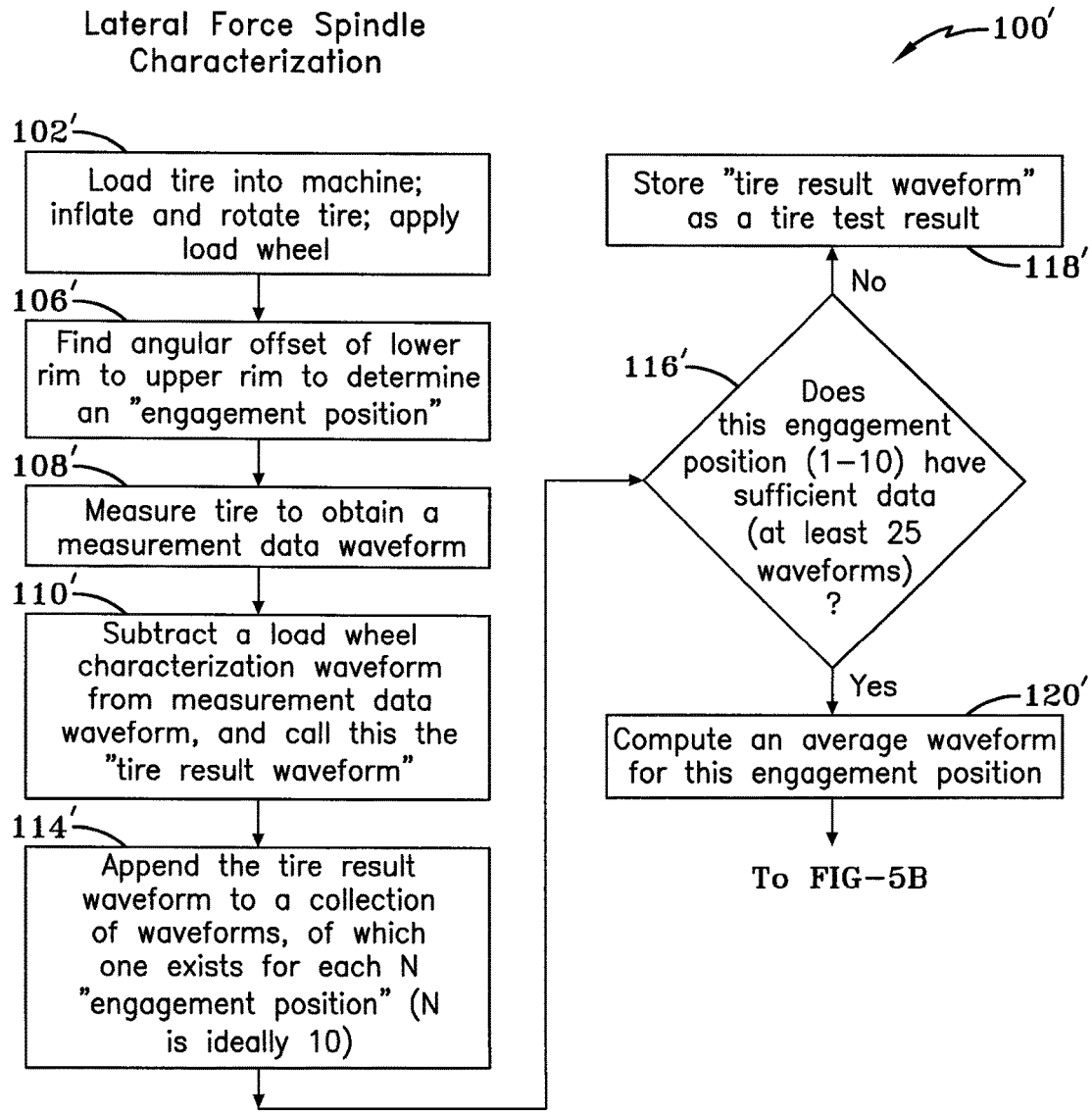
FIGS. 5A and 5B present a flow chart showing a lateral force spindle characterization according to the concepts of the present invention.
Figure 5B:
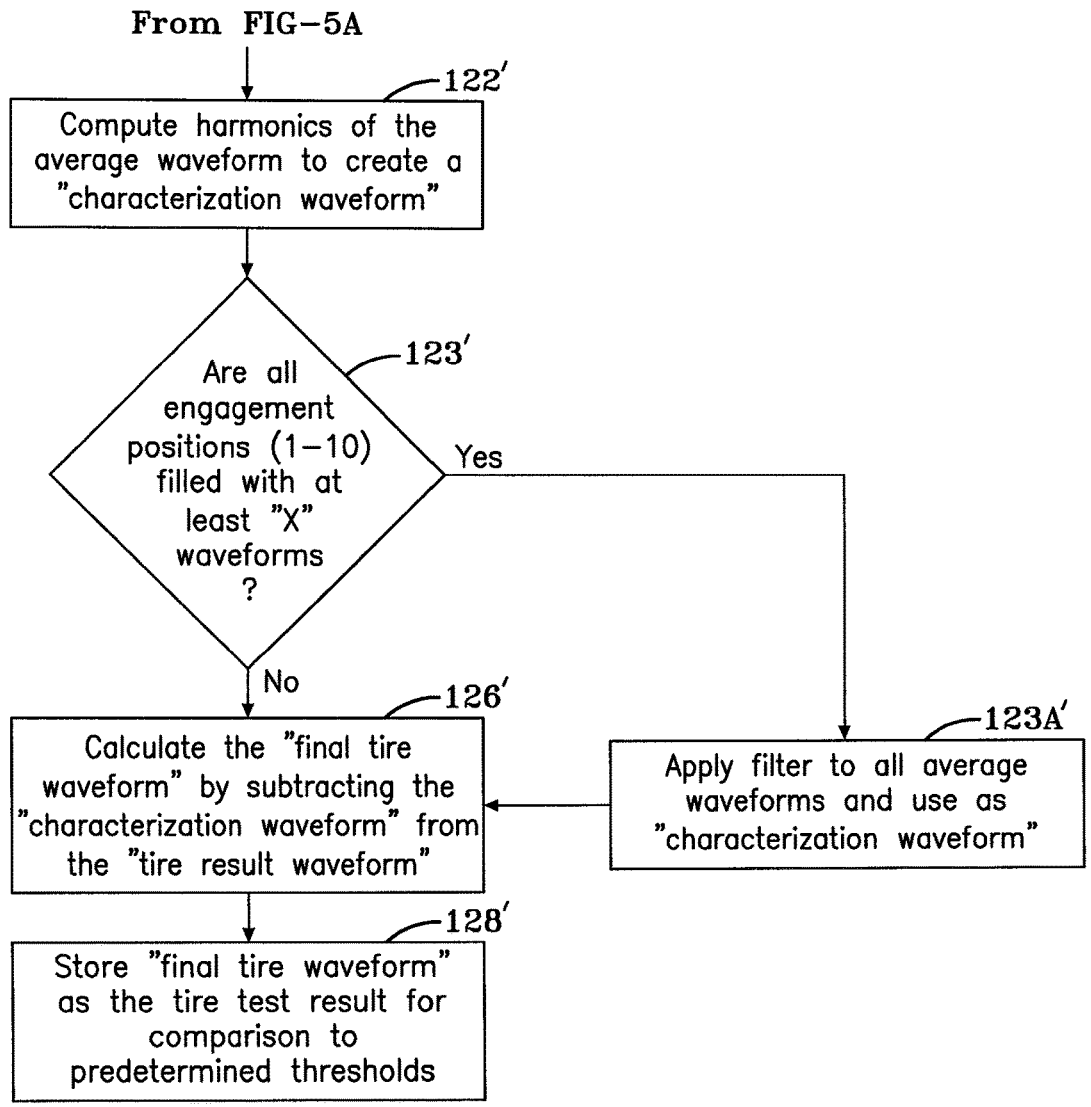
Figure 6A:
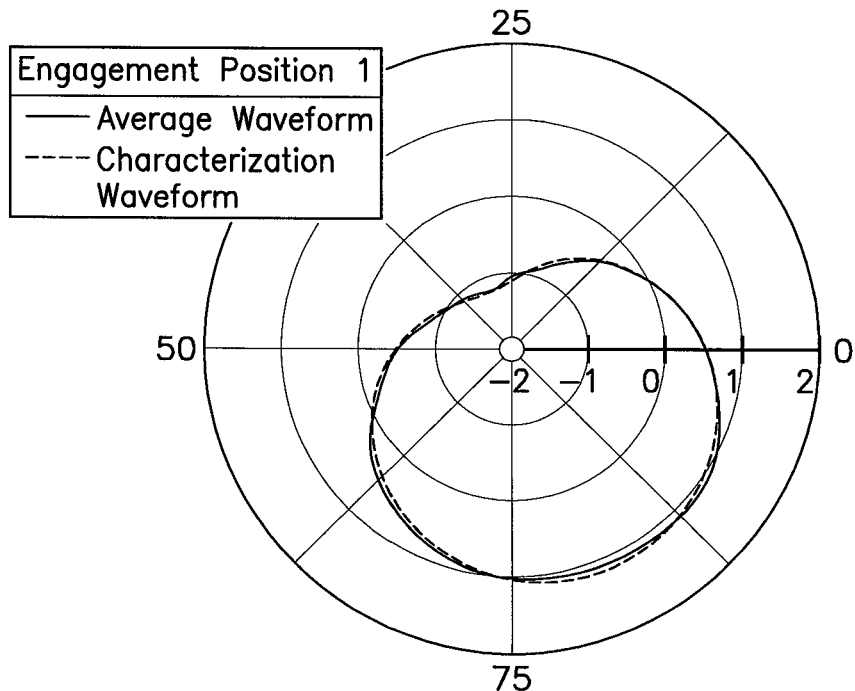
FIGS. 6A-6J are exemplary lateral force spindle characterization waveforms used in the analysis of a tire being tested by the tire uniformity machine.
Figure 6B:
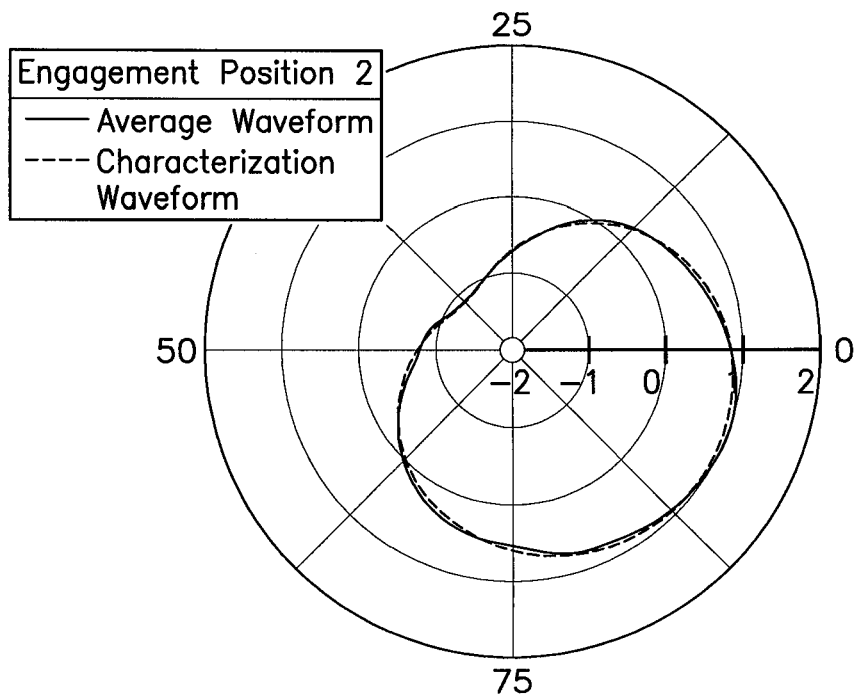
Figure 6C:
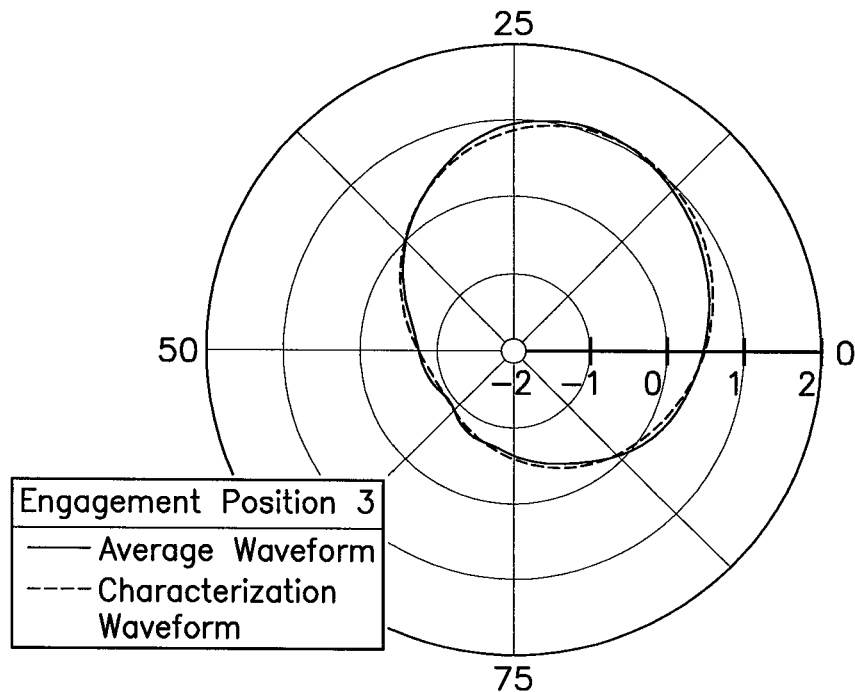
Figure 6D:
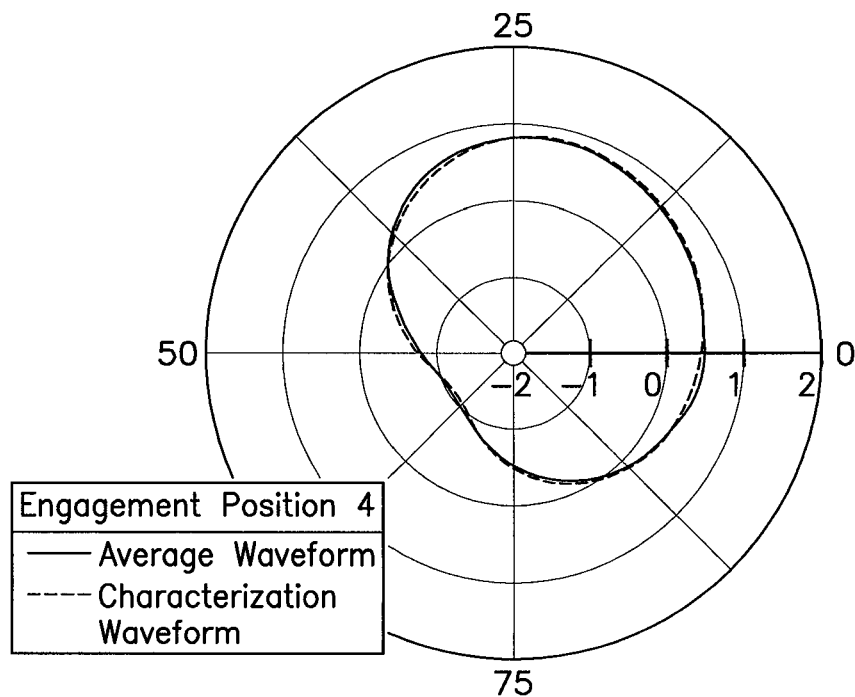
Figure 6E:
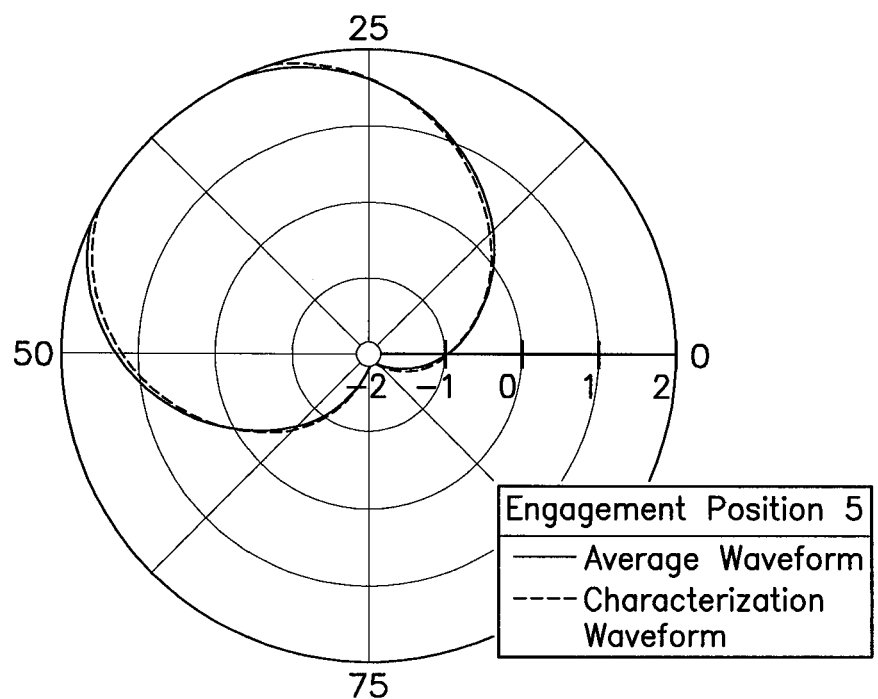
Figure 6F:
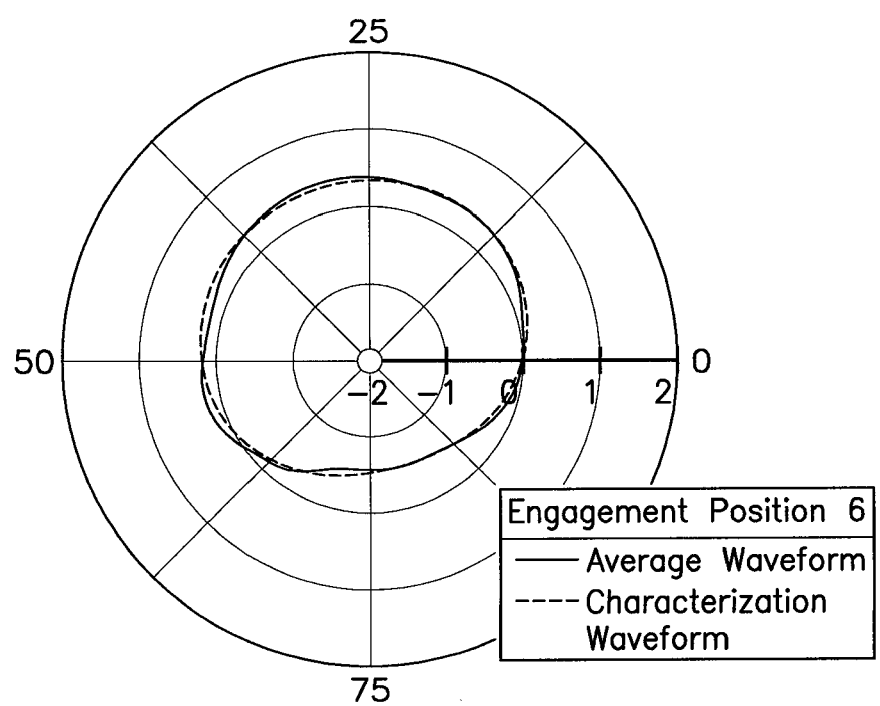
Figure 6G:
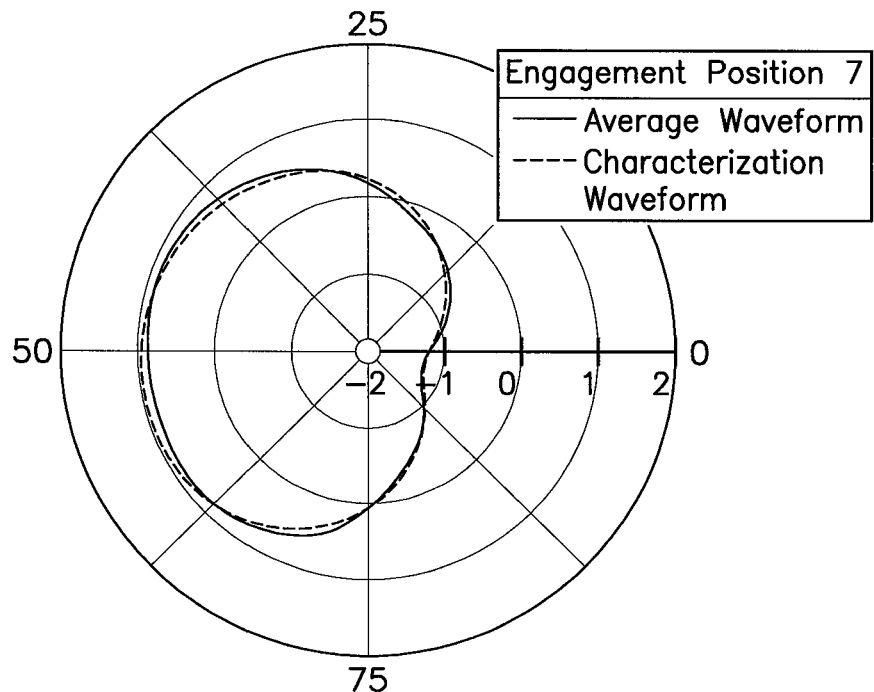
Figure 6H:
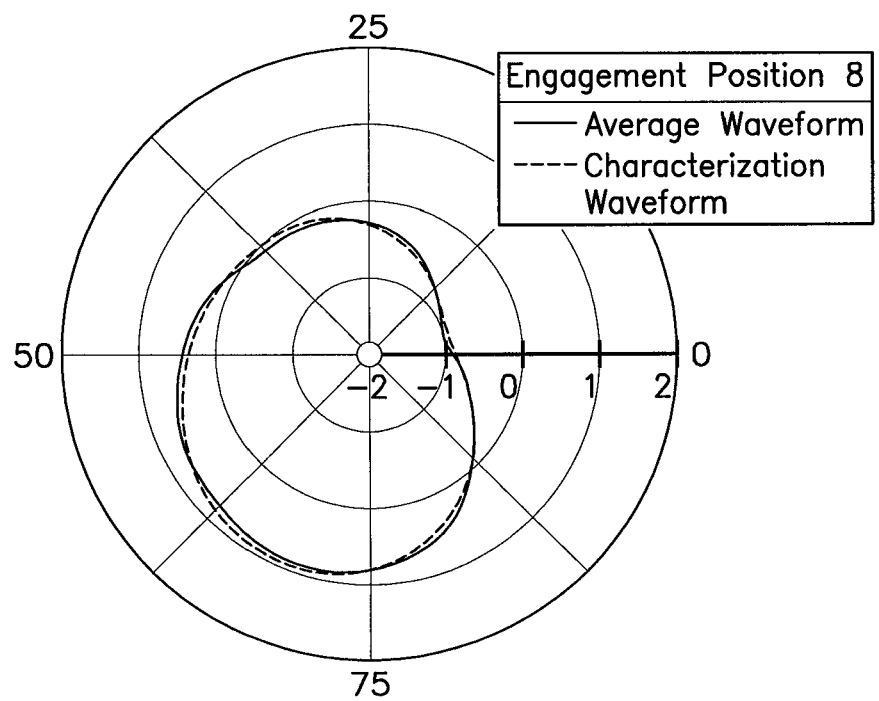
Figure 6I:
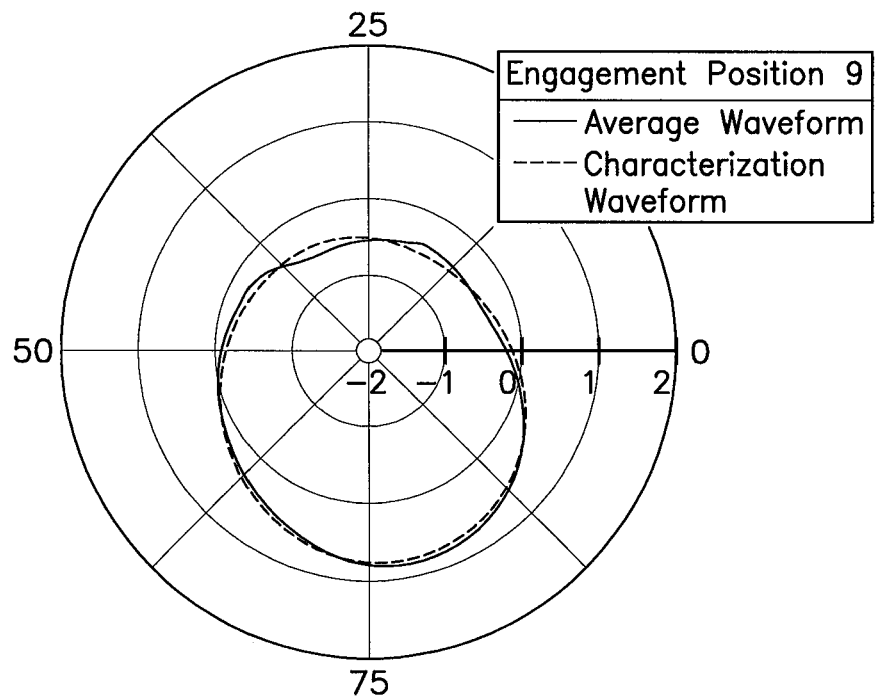
Figure 6J:
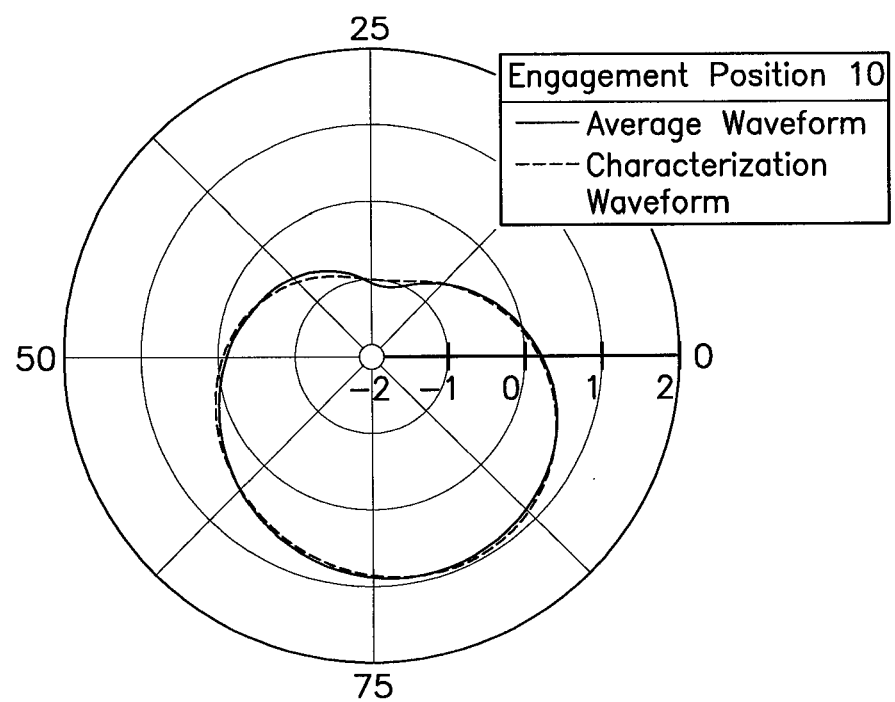

Referring now to FIGS. 6A-J, a series of polar plots are presented which show the effect the designated engagement position has on the lateral force spindle characterization. These plots are similar to the ones presented in FIGS. 4A-J except that the lateral forces, as discussed in relation to FIGS. 5A and 5B, are presented.

As mentioned previously, FIG. 7 shows characterization waveforms. Although the waveforms shown are from radial force measurements, waveforms from lateral force measurements would be generally similar in appearance. In any event, because only ten different engagement positions are used during the collection of tire results, the degree of error increases as the actual angular offset of the rims is further from the center of the engagement position. For instance, the correction waveform for an angular offset of 2° is equal to that of 35° because both offsets lie within the same engagement position, even though both angular offsets are spaced apart. Additionally the correction waveform for 35° can vary greatly compared to the waveform for 37° because both offsets lie within different engagement positions, even though the angular offset of the rims is nearly identical. As a result, FIG. 7 shows a sample set of characterization waveforms, each containing 100 segments along the X axis, generated from all ten engagement positions along the Y axis.

To correct for the errors noted above, application of a filter, such as set out in steps 123/123' and 123A/123A', may be applied to the characterization waveforms. Use of a filter allows for smoothing of all the data points once a sufficient number of data points are collected for all the different combination of angular offsets. Once this occurs, a filter, such as a Gaussian filter, smoothes the collected data, which may allow for a more uniform characterization of the radial forces of the spindle. Of course, other types of filters may be applied. And the filtering may also be applied to the lateral spindle forces. A Gaussian filter can be used to refine the resolution of the characterization waveform across engagement positions, the results of which are shown in FIG. 8. As can be seen, the filter smoothes the waveforms between engagement positions. For example, as seen in FIGS. 7 and 8, there are 10 engagement positions shown which represent 100 possible rim offset positions, wherein each offset position represents a range of about 3.6°. As a result, if the rim offset position is 35 (which represents approximately a 122.4°-126° angular offset), the process will select waveform 200 shown in FIG. 7. This waveform is useful in characterizing the spindle forces, but skilled artisans can see that the waveforms on either side of waveform 200 are provided, in some instances, provide appreciably different values. This can be problematic when immediately adjacent offset positions are associated with different engagement positions. It is believed that applying a filter to all the waveforms, such as shown in FIG. 7, and the resulting graphical representation shown in FIG. 8 allows for more accurately representing the characteristic waveform for a rim position 35, which is designated by the number 210 in FIG. 8. This allows for a selection of a more precise waveform instead of one that may be somewhat distorted or undesirably biased by other waveforms. As a result, the filter makes it possible to calculate a best-fit correction waveform for use as the characterization waveform given the specific angular offset of the upper to lower rim for the currently measured tire.

Based on the foregoing the advantages of the present invention are readily apparent. By characterizing the components of the machine, those characterizations can be used to accurately adjust for radial and lateral spindle variations so as to accurately determine the characteristics of a machine that is testing a tire. The disclosed process recognizes that the upper and lower spindles are not perfectly axially aligned with one another during the testing process, and any number of angular and force combinations may be realized which would mischaracterize the spindle forces and result in less than ideal tire uniformity tests. The disclosed methodology recognizes that the characteristics can be updated during the useful life of the load wheel, spindle components, or other machine changes to ensure that the measurements being detected are accurate. This allows for adjustments to the testing parameters based on imperfections in the load wheel and other components of the machine so as to eliminate any out of roundness or other problems with the machine. By accurately determining non-uniformity of a tire utilizing the machine characterization waveforms, the reliability of the tire test results are increased.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A method for characterizing spindle forces of a tire uniformity machine, comprising:
   receiving a tire in an apparatus having an upper spindle with an upper rim and a lower spindle with a lower rim, wherein said rims capture the tire therebetween;
   applying a load wheel to the tire and collecting a measurement data waveform;
   determining an angular offset of said lower rim in relation to said upper rim so as to define an engagement position among a plurality of engagement positions;
   designating said measurement data waveform as a tire result waveform;
   appending said measurement data waveform to a collection of measurement data waveforms for at least a predetermined number of measurement data waveforms for said engagement position;
   determining whether said predetermined number of measurement data waveforms for said engagement position has been obtained and if not, storing said tire result waveform as a tire test result for said engagement position, and if said predetermined number of measurement data waveforms for said engagement position has been obtained:
      computing an average waveform for said engagement position;
      generating a characterization waveform for each average waveform;
      calculating a final tire waveform by subtracting the characterization waveform from said tire result waveform; and
      storing said final tire waveform as the tire test result.

2. The method according to claim 1, further comprising:
   comparing said tire test result to a predetermined threshold.

3. The method according to claim 1, further comprising:
subtracting a load wheel characterization waveform from said measurement data waveform so as to obtain said tire result waveform prior to the appending step.

4. The method according to claim 3, further comprising:
continuing to append said measurement data waveforms to said collection of measurement data waveforms for said engagement position and updating said average waveform even after sufficient data for said engagement positions has been obtained.

5. The method according to claim 1, further comprising:
associating a tire encoder with said spindle to monitor a rotational position of the tire and said upper spindle with an upper rim;
associating a flag with said lower rim; and
positioning a proximity switch so as to detect said flag and a rotational position of said lower rim, wherein said engagement position is determined from said rotational positions of said lower rim and said upper rim.

6. The method according to claim 1, further comprising:
re-setting said average waveform values for each said engagement position to null whenever any mechanical component of the tire uniformity machine is replaced.

7. The method according to claim 6 wherein said any mechanical component is selected from the group consisting of an upper spindle chuck assembly, a lower spindle chuck assembly, a nose cone, a nose cone cup, a removable rim, a spindle, a rim adapter, and spindle bearings.

8. The method according to claim 1, further comprising:
setting said predetermined number of engagement positions to at least two.

9. The method according to claim 1, further comprising:
computing at least a first harmonic of said average waveform to generate said characterization waveform.

10. The method according to claim 9, further comprising:
filtering said characterization waveform for all engagement positions for use as said characterization waveform.

11. The method according to claim 1, further comprising:
removing said measurement data waveform for an oldest tested tire for each newly tested tire once a predetermined number of said measurement data waveforms have been collected.

12. The method according to claim 1, wherein said characterization waveform is a lateral force characterization waveform.

13. The method according to claim 1, further comprising:
determining a load wheel characterization waveform of said load wheel;
calculating a spring rate of the tire;
subtracting said load wheel characterization from said measurement data waveform and storing as said tire result waveform;
normalizing said tire result waveform based on said spring rate of the tire and storing as a normalized waveform; and
appending said normalized waveforms to a collection of normalized waveforms for at least a predetermined number for said engagement position;
wherein if said predetermined number of normalized waveforms for said engagement position has not been obtained, storing said tire result waveform as said tire test result.

14. The method according to claim 13, further comprising:
continuing to append said normalized waveforms for said engagement positions and computing said characterization waveform even after said predetermined number of said normalized waveforms for each said engagement position has been obtained.

15. The method according to claim 14, further comprising:
multiplying all points in said characterization waveform by said spring rate prior to calculating said final tire waveform.

16. The method according to claim 13, further comprising:
computing at least a first harmonic of said average waveform to generate said characterization waveform.

17. The method according to claim 16, further comprising:
filtering said characterization waveform for all engagement positions for use as said characterization waveform.

18. The method according to claim 13, wherein said characterization waveform is a radial force characterization waveform.

* * * * *